(12) United States Patent
Kost et al.

(10) Patent No.: US 8,212,491 B2
(45) Date of Patent: Jul. 3, 2012

(54) SWITCHING POWER CONVERTER CONTROL WITH TRIAC-BASED LEADING EDGE DIMMER COMPATIBILITY

(75) Inventors: Michael A. Kost, Cedar Park, TX (US); Mauro L. Gaetano, Austin, TX (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 599 days.

(21) Appl. No.: 12/347,138

(22) Filed: Dec. 31, 2008

(65) Prior Publication Data
US 2010/0164406 A1  Jul. 1, 2010

Related U.S. Application Data

(60) Provisional application No. 61/083,717, filed on Jul. 25, 2008.

(51) Int. Cl.
*H05B 41/16* (2006.01)
(52) U.S. Cl. .................. 315/247; 315/308; 315/360
(58) Field of Classification Search .............. 315/209 R, 315/227 R, 246, 247, 283, 291, 307, 308, 315/360
See application file for complete search history.

(56) References Cited

U.S. PATENT DOCUMENTS

| | | |
|---|---|---|
| 3,316,495 A | 4/1967 | Sherer |
| 3,423,689 A | 1/1969 | Miller et al. |
| 3,586,988 A | 6/1971 | Weekes |
| 3,725,804 A | 4/1973 | Langan |
| 3,790,878 A | 2/1974 | Brokaw |
| 3,881,167 A | 4/1975 | Pelton et al. |
| 4,075,701 A | 2/1978 | Hofmann |
| 4,334,250 A | 6/1982 | Theus |
| 4,409,476 A | 10/1983 | Lofgren et al. |
| 4,414,493 A | 11/1983 | Henrich |
| 4,476,706 A | 10/1984 | Hadden et al. |
| 4,523,128 A | 6/1985 | Stamm et al. |

(Continued)

FOREIGN PATENT DOCUMENTS
DE   19713814   10/1998
(Continued)

OTHER PUBLICATIONS

Mamano, Bob, "Current Sensing Solutions for Power Supply Designers", Unitrode Seminar Notes SEM1200, 1999.

(Continued)

*Primary Examiner* — Thuy Vinh Tran
(74) *Attorney, Agent, or Firm* — Hamilton & Terrile, LLP; Kent B. Chambers

(57) ABSTRACT

In at least one embodiment, a controller allows triac-based dimmer to properly function and dim a load whose voltage is regulated by a switching power converter. In at least one embodiment, the switching power converter includes a switch to control voltage conversion of an input voltage to the switching power converter, wherein phase delays are introduced in the input voltage by a triac-based dimmer during a dimming period. In at least one embodiment, the controller is configured to control the switch of the switching power converter to establish an input resistance of the switching power converter during a dimming portion of the input voltage, wherein the input resistance allows the triac-based dimmer to phase modulate a supply voltage to the dimmer so that an output voltage of the dimmer has a substantially uninterrupted phase delay during each half-cycle of the supply voltage during the dimming period.

25 Claims, 12 Drawing Sheets

U.S. PATENT DOCUMENTS

| | | |
|---|---|---|
| 4,677,366 A | 6/1987 | Wilkinson et al. |
| 4,683,529 A | 7/1987 | Bucher |
| 4,700,188 A | 10/1987 | James |
| 4,737,658 A | 4/1988 | Kronmuller et al. |
| 4,797,633 A | 1/1989 | Humphrey |
| 4,937,728 A | 6/1990 | Leonardi |
| 4,940,929 A | 7/1990 | Williams |
| 4,973,919 A | 11/1990 | Allfather |
| 4,979,087 A | 12/1990 | Sellwood et al. |
| 4,980,898 A | 12/1990 | Silvian |
| 4,992,919 A | 2/1991 | Lee et al. |
| 4,994,952 A | 2/1991 | Silva et al. |
| 5,001,620 A | 3/1991 | Smith |
| 5,055,746 A | 10/1991 | Hu et al. |
| 5,109,185 A | 4/1992 | Ball |
| 5,121,079 A | 6/1992 | Dargatz |
| 5,206,540 A | 4/1993 | de Sa e Silva et al. |
| 5,264,780 A | 11/1993 | Bruer et al. |
| 5,278,490 A | 1/1994 | Smedley |
| 5,323,157 A | 6/1994 | Ledzius et al. |
| 5,359,180 A | 10/1994 | Park et al. |
| 5,383,109 A | 1/1995 | Maksimovic et al. |
| 5,424,932 A | 6/1995 | Inou et al. |
| 5,477,481 A | 12/1995 | Kerth |
| 5,479,333 A | 12/1995 | McCambridge et al. |
| 5,481,178 A | 1/1996 | Wilcox et al. |
| 5,565,761 A | 10/1996 | Hwang |
| 5,589,759 A | 12/1996 | Borgato et al. |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,768,111 A | 6/1998 | Zaitsu |
| 5,781,040 A | 7/1998 | Myers |
| 5,783,909 A | 7/1998 | Hochstein |
| 5,798,635 A | 8/1998 | Hwang et al. |
| 5,900,683 A | 5/1999 | Rinehart et al. |
| 5,912,812 A | 6/1999 | Moriarty, Jr. |
| 5,929,400 A | 7/1999 | Colby et al. |
| 5,946,202 A | 8/1999 | Balogh |
| 5,946,206 A | 8/1999 | Shimizu et al. |
| 5,952,849 A | 9/1999 | Haigh |
| 5,960,207 A | 9/1999 | Brown |
| 5,962,989 A | 10/1999 | Baker |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,072,969 A | 6/2000 | Yokomori et al. |
| 6,083,276 A | 7/2000 | Davidson et al. |
| 6,084,450 A | 7/2000 | Smith et al. |
| 6,091,233 A | 7/2000 | Hwang |
| 6,125,046 A | 9/2000 | Jang et al. |
| 6,150,774 A | 11/2000 | Mueller et al. |
| 6,181,114 B1 | 1/2001 | Hemena et al. |
| 6,211,626 B1 | 4/2001 | Lys et al. |
| 6,211,627 B1 | 4/2001 | Callahan |
| 6,229,271 B1 | 5/2001 | Liu |
| 6,229,292 B1 | 5/2001 | Redl et al. |
| 6,246,183 B1 | 6/2001 | Buonavita |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,344,811 B1 | 2/2002 | Melanson |
| 6,369,525 B1 | 4/2002 | Chang et al. |
| 6,385,063 B1 | 5/2002 | Sadek et al. |
| 6,407,514 B1 | 6/2002 | Glaser et al. |
| 6,407,515 B1 | 6/2002 | Hesler |
| 6,407,691 B1 | 6/2002 | Yu |
| 6,441,558 B1 | 8/2002 | Muthu et al. |
| 6,445,600 B2 | 9/2002 | Ben-Yaakov |
| 6,452,521 B1 | 9/2002 | Wang |
| 6,469,484 B2 | 10/2002 | L'Hermite et al. |
| 6,495,964 B1 | 12/2002 | Muthu et al. |
| 6,509,913 B2 | 1/2003 | Martin, Jr. et al. |
| 6,531,854 B2 | 3/2003 | Hwang |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,636,003 B2 | 10/2003 | Rahm et al. |
| 6,646,848 B2 | 11/2003 | Yoshida et al. |
| 6,657,417 B1 | 12/2003 | Hwang |
| 6,688,753 B2 | 2/2004 | Calon et al. |
| 6,713,974 B2 | 3/2004 | Patchornik et al. |
| 6,724,174 B1 | 4/2004 | Esteves et al. |
| 6,727,832 B1 | 4/2004 | Melanson |
| 6,737,845 B2 | 5/2004 | Hwang |
| 6,741,123 B1 | 5/2004 | Melanson et al. |
| 6,753,661 B2 | 6/2004 | Muthu et al. |
| 6,756,772 B2 | 6/2004 | McGinnis |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,958,920 B2 | 10/2005 | Mednik et al. |
| 6,963,496 B2 | 11/2005 | Bimbaud |
| 6,967,448 B2 | 11/2005 | Morgan et al. |
| 6,970,503 B1 | 11/2005 | Kalb |
| 6,975,079 B2 | 12/2005 | Lys et al. |
| 6,975,523 B2 | 12/2005 | Kim et al. |
| 6,980,446 B2 | 12/2005 | Simada et al. |
| 7,003,023 B2 | 2/2006 | Krone et al. |
| 7,034,611 B2 | 4/2006 | Oswal et al. |
| 7,050,509 B2 | 5/2006 | Krone et al. |
| 7,064,498 B2 | 6/2006 | Dowling et al. |
| 7,064,531 B1 | 6/2006 | Zinn |
| 7,072,191 B2 | 7/2006 | Nakao et al. |
| 7,075,329 B2 | 7/2006 | Chen et al. |
| 7,078,963 B1 | 7/2006 | Andersen et al. |
| 7,088,059 B2 | 8/2006 | McKinney et al. |
| 7,099,163 B1 | 8/2006 | Ying |
| 7,102,902 B1 | 9/2006 | Brown et al. |
| 7,106,603 B1 | 9/2006 | Lin et al. |
| 7,109,791 B1 | 9/2006 | Epperson et al. |
| 7,126,288 B2 | 10/2006 | Ribarich et al. |
| 7,135,824 B2 | 11/2006 | Lys et al. |
| 7,145,295 B1 | 12/2006 | Lee et al. |
| 7,158,633 B1 | 1/2007 | Hein |
| 7,161,816 B2 | 1/2007 | Shteynberg et al. |
| 7,180,250 B1 | 2/2007 | Gannon |
| 7,183,957 B1 | 2/2007 | Melanson |
| 7,221,130 B2 | 5/2007 | Ribeiro et al. |
| 7,233,135 B2 | 6/2007 | Noma et al. |
| 7,246,919 B2 | 7/2007 | Porchia et al. |
| 7,255,457 B2 | 8/2007 | Ducharm et al. |
| 7,266,001 B1 | 9/2007 | Notohamiprodjo et al. |
| 7,276,861 B1 | 10/2007 | Shteynberg et al. |
| 7,288,902 B1 | 10/2007 | Melanson |
| 7,292,013 B1 | 11/2007 | Chen et al. |
| 7,310,244 B2 | 12/2007 | Yang et al. |
| 7,345,458 B2 | 3/2008 | Kanai et al. |
| 7,375,476 B2 | 5/2008 | Walter et al. |
| 7,388,764 B2 | 6/2008 | Huynh et al. |
| 7,394,210 B2 | 7/2008 | Ashdown |
| 7,511,437 B2 | 3/2009 | Lys et al. |
| 7,538,499 B2 | 5/2009 | Ashdown |
| 7,545,130 B2 | 6/2009 | Latham |
| 7,554,473 B2 | 6/2009 | Melanson |
| 7,569,996 B2 | 8/2009 | Holmes et al. |
| 7,583,136 B2 | 9/2009 | Pelly |
| 7,656,103 B2 | 2/2010 | Shteynberg et al. |
| 7,667,986 B2 | 2/2010 | Artusi et al. |

| | | |
|---|---|---|
| 7,710,047 B2 | 5/2010 | Shteynberg et al. |
| 7,719,246 B2 | 5/2010 | Melanson |
| 7,719,248 B1 | 5/2010 | Melanson |
| 7,746,043 B2 | 6/2010 | Melanson |
| 7,746,671 B2 | 6/2010 | Radecker et al. |
| 7,750,738 B2 | 7/2010 | Bach |
| 7,756,896 B1 | 7/2010 | Feingold |
| 7,777,563 B2 | 8/2010 | Midya et al. |
| 7,804,256 B2 | 9/2010 | Melanson |
| 7,804,480 B2 | 9/2010 | Jeon et al. |
| 7,852,017 B1 * | 12/2010 | Melanson ............. 315/291 |
| 2002/0065583 A1 | 5/2002 | Okada |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yanai et al. |
| 2004/0227571 A1 | 11/2004 | Kuribayashi |
| 2004/0228116 A1 | 11/2004 | Miller et al. |
| 2004/0232971 A1 | 11/2004 | Kawasaki et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0218838 A1 | 10/2005 | Lys |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0002110 A1 | 1/2006 | Dowling |
| 2006/0022916 A1 | 2/2006 | Aiello |
| 2006/0023002 A1 | 2/2006 | Hara et al. |
| 2006/0116898 A1 | 6/2006 | Peterson |
| 2006/0125420 A1 | 6/2006 | Boone et al. |
| 2006/0184414 A1 | 8/2006 | Pappas et al. |
| 2006/0214603 A1 | 9/2006 | Oh et al. |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0103949 A1 | 5/2007 | Tsuruya |
| 2007/0124615 A1 | 5/2007 | Orr |
| 2007/0126656 A1 | 6/2007 | Huang et al. |
| 2007/0182699 A1 | 8/2007 | Ha et al. |
| 2007/0285031 A1 | 12/2007 | Shteynberg et al. |
| 2008/0012502 A1 | 1/2008 | Lys |
| 2008/0027841 A1 | 1/2008 | Eder |
| 2008/0030148 A1 * | 2/2008 | Tang et al. ............. 315/291 |
| 2008/0043504 A1 | 2/2008 | Ye et al. |
| 2008/0054815 A1 | 3/2008 | Kotikalapoodi et al. |
| 2008/0116818 A1 | 5/2008 | Shteynberg et al. |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224629 A1 * | 9/2008 | Melanson ............. 315/247 |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0070188 A1 | 3/2009 | Scott et al. |
| 2009/0147544 A1 | 6/2009 | Melanson |
| 2009/0174479 A1 | 7/2009 | Yan et al. |
| 2009/0218960 A1 | 9/2009 | Lyons et al. |
| 2010/0141317 A1 | 6/2010 | Szajnowski |

FOREIGN PATENT DOCUMENTS

| | | |
|---|---|---|
| EP | 0585789 A1 | 3/1994 |
| EP | 0632679 | 1/1995 |
| EP | 0838791 | 4/1998 |
| EP | 0910168 A1 | 4/1999 |
| EP | 1014563 | 6/2000 |
| EP | 1164819 A | 12/2001 |
| EP | 1213823 A2 | 6/2002 |
| EP | 1460775 | 9/2004 |
| EP | 1528785 A | 5/2005 |
| EP | 2204905 A1 | 7/2010 |
| GB | 2069269 A | 8/1981 |
| JP | WO 2006/022107 A2 | 3/2006 |
| WO | WO9725836 | 7/1997 |
| WO | 01/15316 A1 | 1/2001 |
| WO | 01/97384 A | 12/2001 |
| WO | 02/15386 A2 | 2/2002 |
| WO | WO0227944 | 4/2002 |
| WO | 02/091805 A2 | 11/2002 |
| WO | WO2006013557 | 2/2006 |
| WO | 2006/067521 A | 6/2006 |
| WO | WO2006135584 | 12/2006 |
| WO | 2007/026170 A | 3/2007 |
| WO | 2007/079362 A | 7/2007 |
| WO | WO2008072160 | 6/2008 |
| WO | WO20080152838 | 12/2008 |

OTHER PUBLICATIONS http://toolbarpdf.com/docs/functions-and-features-of-inverters.html printed on Jan. 20, 2011.
Linear Technology, "Single Switch PWM Controller with Auxiliary Boost Converter," LT1950 Datasheet, Linear Technology, Inc. Milpitas, CA, 2003.
Yu, Zhenyu, 3.3V DSP for Digital Motor Control, Texas Instruments, Application Report SPRA550 dated Jun. 1999.
International Rectifier, Data Sheet No. PD60143-0, Current Sensing Single Channel Driver, El Segundo, CA, dated Sep. 8, 2004.
Balogh, Laszlo, "Design and Application Guide for High Speed MOSFET Gate Drive Circuits" [Online] 2001, Texas Instruments, Inc., SEM-1400, Unitrode Power Supply Design Seminar, Topic II, TI literature No. SLUP133, XP002552367, Retrieved from the Internet: URL:htt/:///focus.ti.com/lit/ml/slup169/slup169.pdf the whole document.
PCT US09/51757 International Search Report and Written Opinion dated Aug. 28, 2009.
ST Datasheet L6562, Transition-Mode PFC Controller, 2005, STMicroelectronics, Geneva, Switzerland.
Maksimovic, Regan Zane and Robert Erickson, Impact of Digital Control in Power Electronics, Proceedings of 2004 International Symposium on Power Semiconductor Devices & ICS, Kitakyushu, Apr. 5, 2010, Colorado Power Electronics Center, ECE Department, University of Colorado, Boulder, CO.
Texas Instruments, Interleaving Continuous Conduction Mode PFC Controller, UCC28070, SLUS794C, Nov. 2007, revised Jun. 2009, Texas Instruments, Dallas TX.
Power Integration, Inc., "TOP200-4/14 TOPSwitch Family Three-terminal Off-line PWM Switch", XP-002524650, Jul. 1996, Sunnyvale, California.
Texas Instruments, SLOS318F, "High-Speed, Low Noise, Fully-Differential I/O Amplifiers," THS4130 and THS4131, US, Jan. 2006.
International Search Report and Written Opinion, PCT US20080062387, dated Feb. 5, 2008.
International Search Report and Written Opinion, PCT US200900032358, dated Jan. 29, 2009.
Hirota, Atsushi et al, "Analysis of Single Switch Delta-Sigma Modulated Pulse Space Modulation PFC Converter Effectively Using Switching Power Device," IEEE, US, 2002.

Prodic, Aleksandar, "Digital Controller for High-Frequency Rectifiers with Power Factor Correction Suitable for On-Chip Implemenetation," IEEE, US, 2007.
International Search Report and Written Opinion, PCT US20080062379, dated Feb. 5, 2008.
International Search Report and Written Opinion, PCT US20090032351, dated Jan. 29, 2009.
Erickson, Robert W. et al, "Fundamentals of Power Electronics," Second Edition, Chapter 6, Boulder, CO, 2001.
Allegro Microsystems, A1442 ,"Low Voltage Full Bridge Brushless DC Motor Driver with Hall Commutation and Soft-Switching, and Reverse Battery, Short Circuit, and Thermal Shutdown Protection," Worcester, MA, 2009.
Texas Instruments, SLUS828B, "8-Pin Continuous Conduction Mode (CCM) PFC Controller", UCC28019A, US, revised Apr. 2009.
Analog Devices, "120 kHz Bandwidth, Low Distortion, Isolation Amplifier", AD215, Norwood, MA, 1996.
Burr-Brown, ISO120 and ISO121, "Precision Los Cost Isolation Amplifier," Tucson AZ, Mar. 1992.
Burr-Brown, ISO130, "High IMR, Low Cost Isolation Amplifier," SBOS220, US, Oct. 2001.
International Search Report and Written Report PCT US20080062428 dated Feb. 5, 2008.
Prodic, A. et al, "Dead Zone Digital Controller for Improved Dynamic Response of Power Factor Preregulators," IEEE, 2003.
"HV9931 Unity Power Factor LED Lamp Driver, Initial Release", Supertex Inc., Sunnyvale, CA USA 2005.
International Search Report PCT/GB2006/003259 dated Jan. 12, 2007.
Written Opinion of the International Searching Authority PCT/US2008/056739 dated Dec. 3, 2008.
International Search Report PCT/US2008/056606 dated Dec. 3, 2008.
Written Opinion of the International Searching Authority PCT/US2008/056606 dated Dec. 3, 2008.
International Search Report PCT1US2008/056608 dated Dec. 3, 2008.
Written Opinion of the International Searching Authority PCT/US2008/056608 dated Dec. 3, 2008.
International Search Report PCT/GB2005/050228 dated Mar. 14, 2006.
International Search Report PCT/US2008/062387 dated Jan. 10, 2008.
Data Sheet LT3496 Triple Output LED Driver, Linear Technology Corporation, Milpitas, CA 2007.
Linear Technology, News Release, Triple Output Led, LT3496, Linear Technology, Milpitas, CA, May 24, 2007.
AN-H52 Application Note: "HV9931 Unity Power Factor LED Lamp Driver" Mar. 7, 2007, Supertex Inc., Sunnyvale, CA, USA.
Dustin Rand et al: "Issues, Models and Solutions for Triac Modulated Phase Dimming of LED Lamps" Power Electronics Specialists Conference, 2007. PESC 2007, IEEE, IEEE, P1, Jun. 1, 2007, pp. 1398-1404.
Spiazzi G et al: "Analysis of a High-Power-Factor Electronic Ballast for High Brightness Light Emitting Diodes" Power Electronics Specialists, 2005 IEEE 36th Conference on June 12, 2005, Piscatawa, NJ USA, IEEE, Jun. 12, 2005, pp. 1494-1499.
International Search Report PCT/US2008/062381 dated Feb. 5, 2008.
International Search Report PCT/US2008/056739 dated Dec. 3, 2008.
Written Opinion of the International Searching Authority PCT/US2008/062381 dated Feb. 5, 2008.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
International Search Report PCT/US2008/062398 dated Feb. 2, 2005.
Partial International Search PCT/US2008/062387 dated Feb. 5, 2008.
Noon, Jim "UC3855A/B High Performance Power Factor Preregulator", Texas Instruments, SLUA146A, May 1996, Revised Apr. 2004.

"High Performance Power Factor Preregulator", Unitrode Products from Texas Instruments, SLUS382B, Jun. 1998, Revised Oct. 2005.
Written Opinion of the International Searching Authority PCT/US2008/056739.
International Search Report PCT/US2008/056608 dated Dec. 3, 2008.
International Search PCT/US2008/062387 dated Jan. 10, 2008.
Data Sheet LT3496 Triple Output LED Driver, 2007, Linear Technology Corporation, Milpitas, CA.
News Release, Triple Output LED, LT3496.
Infineon, CCM-PFC Standalone Power Factor Correction (PFC) Controller in Continuous Conduction Mode (CCM), Version 2.1, Feb. 6, 2007.
International Rectifier, IRAC1150-300W Demo Board, User's Guide, Rev 3.0, Aug. 2, 2005.
International Rectifier, Application Note AN-1077,PFC Converter Design with IR1150 One Cycle Control IC, rev. 2.3, Jun. 2005.
International Rectifier, Data Sheet PD60230 revC, Feb. 5, 2007.
Lu et al, International Rectifier, Bridgeless PFC Implementation Using One Cycle Control Technique, 2005.
Linear Technology, LT1248, Power Factor Controller, Apr. 20, 2007.
ON Semiconductor, AND8123/D, Power Factor Correction Stages Operating in Critical Conduction Mode, Sep. 2003.
ON Semiconductor, MC33260, GreenLine Compact Power Factor Controller: Innovative Circuit for Cost Effective Solutions, Sep. 2005.
ON Semiconductor, NCP1605, Enhanced, High Voltage and Efficient Standby Mode, Power Factor Controller, Feb. 2007.
ON Semconductor, NCP1606, Cost Effective Power Factor Controller, Mar. 2007.
ON Semiconductor, NCP1654, Product Review, Power Factor Controller for Compact and Robust, Continuous Conduction Mode Pre-Converters, Mar. 2007.
Philips, Application Note, 90W Resonant SMPS with TEA1610 SwingChip, AN99011, 1999.
NXP, TEA1750, GreenChip III SMPS control IC Product Data Sheet, Apr. 6, 2007.
Renesas, HA16174P/FP, Power Factor Correction Controller IC, Jan. 6, 2006.
Renesas Technology Releases Industry's First Critical-Mode Power Factor Correction Control IC Implementing Interleaved Operation, Dec. 18, 2006.
Renesas, Application Note R2A20111 EVB, PFC Control IC R2A20111 Evaluation Board, Feb. 2007.
STMicroelectronics, L6563, Advanced Transition-Mode PFC Controller, Mar. 2007.
Texas Instruments, Application Note SLUA321, Startup Current Transient of the Leading Edge Triggered PFC Controllers, Jul. 2004.
Texas Instruments, Application Report SLUA309A, Avoiding Audible Noise at Light Loads when using Leading Texas Triggered PFC Converters, Sep. 2004.
Texas Instruments, Application Report SLUA369B, 350-W, Two-Phase Interleaved PFC Pre-Regulator Design Review, Mar. 2007.
Unitrode, High Power-Factor Preregulator, Oct. 1994.
Texas Instruments, Transition Mode PFC Controller, SLUS515D, Jul. 2005.
Unitrode Products From Texas Instruments, Programmable Output Power Factor Preregulator, Dec. 2004.
Unitrode Products From Texas Instruments, High Performance Power Factor Preregulator, Oct. 2005.
Texas Instruments, UCC3817 BiCMOS Power Factor Preregulator Evaluation Board User's Guide, Nov. 2002.
Unitrode, L. Balogh, Design Note UC3854A/B and UC3855A/B Provide Power Limiting with Sinusoidal Input Current PFC Front Ends, SLUA196A, Nov. 2001.
A. Silva De Morais et al., A High Power Factor Ballast Using a Single Switch with Both Power Stages Integrated, IEEE Transactions on Power Electronics, vol. 21, No. 2, Mar. 2006.
M. Ponce et al., High-Efficient Integrated Electronic Ballast for Compact Fluorescent Lamps, IEEE Transactions on Power Electronics, vol. 21, No. 2, Mar. 2006.

A. R. Seidel et al., A Practical Comparison Among High-Power-Factor Electronic Ballasts with Similar Ideas, IEEE Transactions on Industry Applications, vol. 41, No. 6, Nov.-Dec. 2005.
F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 3, Sep. 2005.
J. A. Vilela Jr. et al., An Electronic Ballast with High Power Factor and Low Voltage Stress, IEEE Transactions on Industry Applications, vol. 41, No. 4, Jul./Aug. 2005.
S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.
M. K. Kazimierczuk et al., Electronic Ballast for Fluorescent Lamps, IEEE Transactions on Power Electronics, vol. 8, No. 4, Oct. 1993.
S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.
H. L. Cheng et al., A Novel Single-Stage High-Power-Factor Electronic Ballast with Symmetrical Topology, IEEE Transactions on Power Electronics, vol. 50, No. 4, Aug. 2003.
J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.
Q. Li et al., An Analysis of the ZVS Two-Inductor Boost Converter under Variable Frequency Operation, IEEE Transactions on Power Electronics, vol. 22, No. 1, Jan. 2007.
H. Peng et al., Modeling of Quantization Effects in Digitally Controlled DC-DC Converters, IEEE Transactions on Power Electronics, vol. 22, No. 1, Jan. 2007.
G. Yao et al., Soft Switching Circuit for Interleaved Boost Converters, IEEE Transactions on Power Electronics, vol. 22, No. 1, Jan. 2007.
C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.
W. Zhang et al., A New Duty Cycle Control Strategy for Power Factor Correction and FPGA Implementation, IEEE Transactions on Power Electronics, vol. 21, No. 6, Nov. 2006.
H. Wu et al., Single Phase Three-Level Power Factor Correction Circuit with Passive Lossless Snubber, IEEE Transactions on Power Electronics, vol. 17, No. 2, Mar. 2006.
O. Garcia et al., High Efficiency PFC Converter to Meet EN61000-3-2 and A14, Proceedings of the 2002 IEEE International Symposium on Industrial Electronics, vol. 3, 2002.
P. Lee et al., Steady-State Analysis of an Interleaved Boost Converter with Coupled Inductors, IEEE Transactions on Industrial Electronics, vol. 47, No. 4, Aug. 2000.
D.K.W. Cheng et al., A New Improved Boost Converter with Ripple Free Input Current Using Coupled Inductors, Power Electronics and Variable Speed Drives, Sep. 21-23, 1998.
B.A. Miwa et al., High Efficiency Power Factor Correction Using Interleaved Techniques, Applied Power Electronics Conference and Exposition, Seventh Annual Conference Proceedings, Feb. 23-27, 1992.
Z. Lai et al., A Family of Power-Factor-Correction Controllers, Twelfth Annual Applied Power Electronics Conference and Exposition, vol. 1, Feb. 23, 1997-Feb. 27, 1997.
L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.
Fairchild Semiconductor, Application Note 42030, Theory and Application of the ML4821 Average Current Mode PFC Controller, Oct. 25, 2000.
Unitrode Products From Texas Instruments, BiCMOS Power Factor Preregulator, Feb. 2006.
D. Hausman, Lutron, RTISS-TE Operation, Real-Time Illumination Stability Systems for Trailing-Edge (Reverse Phase Control) Dimmers, v. 1.0 Dec. 2004.

International Rectifier, Data Sheet No. PD60230 revC, IR1150(S)(PbF), uPFC One Cycle Control PFC IC Feb. 5, 2007.
Texas Instruments, Application Report SLUA308, UCC3817 Current Sense Transformer Evaluation, Feb. 2004.
Texas Instruments, Application Report SPRA902A, Average Current Mode Controlled Power Factor Correctiom Converter using TMS320LF2407A, Jul. 2005.
Unitrode, Design Note DM-39E, Optimizing Performance in UC3854 Power Factor Correction Applications, Nov. 1994.
Fairchild Semiconductor, Application Note 42030, Theory and Application of the ML4821 Average Currrent Mode PFC Controller, Aug. 1997.
Fairchild Semiconductor, Application Note AN4121, Design of Power Factor Correction Circuit Using FAN7527B, Rev. 1.0.1, May 30, 2003.
Fairchild Semiconductor, Application Note 6004, 500W Power-Factor-Corrected (PFC) Converter Design with FAN4810, Rev. 1.0.1, Oct. 31, 2003.
Fairchild Semiconductor, FAN4822, ZVA Average Current PFC Controller, Rev. 1.0.1 Aug. 10, 2001.
Fairchild Semiconductor, ML4821, Power Factor Controller, Rev. 1.0.2, Jun. 19, 2001.
Fairchild Semiconductor, ML4812, Power Factor Controller, Rev. 1.0.4, May 31, 2001.
Linear Technology, 100 Watt LED Driver, Linear Technology, 2006.
Fairchild Semiconductor, FAN7544, Simple Ballast Controller, Rev. 1.0.0, 2004.
Fairchild Semiconductor, FAN7532, Ballast Controller, Rev. 1.0.2, Jun. 2006.
Fairchild Semiconductor, FAN7711, Ballast Control IC, Rev. 1.0.2, Mar. 2007.
Fairchild Semiconductor, KA7541, Simple Ballast Controller, Rev. 1.0.3, 2001.
ST Microelectronics, L6574, CFL/TL Ballast Driver Preheat and Dimming, Sep. 2003.
ST Microelectronics, AN993, Application Note, Electronic Ballast with PFC Using L6574 and L6561, May 2004.
International Search Report and Written Opinion for PCT/US2008/062384 dated Jan. 14, 2008.
S. Dunlap et al., Design of Delta-Sigma Modulated Switching Power Supply, Circuits & Systems, Proceedings of the 1998 IEEE International Symposium, 1998.
Freescale Semiconductor, Inc., Dimmable Light Ballast with Power Factor Correction, Design Reference Manual, DRM067, Rev. 1, Dec. 2005.
J. Zhou et al, Novel Sampling Algorithm for DSP Controlled 2 kW PFC Converter, IEEE Transactions on Power Electronics, vol. 16, No. 2, Mar. 2001.
A. Prodic, Compensator Design and Stability Assessment for Fast Voltage Loops of Power Factor Correction Rectifiers, IEEE Transactions on Power Electronics, vol. 22, No. 5, Sep. 2007.
M. Brkovic et al., "Automatic Current Shaper with Fast Output Regulation and Soft-Switching," S.15.C Power Converters, Telecommunications Energy Conference, 1993.
Dallas Semiconductor, Maxim, "Charge-Pump and Step-Up DC-DC Converter Solutions for Powering White LEDs in Series or Parallel Connections," Apr. 23, 2002.
Freescale Semiconductor, AN3052, Implementing PFC Average Current Mode Control Using the MC9S12E128, Nov. 2005.
D. Maksimovic et al., "Switching Converters with Wide DC Conversion Range," Institute of Electrical and Electronic Engineer's (IEEE) Transactions on Power Electronics, Jan. 1991.
V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.
S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.

K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.

K. Leung et al., "Dynamic Hysteresis Band Control of the Buck Converter with Fast Transient Response," IEEE Transactions on Circuits and Systems—II: Express Briefs, vol. 52, No. 7, Jul. 2005.

Y. Ohno, Spectral Design Considerations for White LED Color Rendering, Final Manuscript, Optical Engineering, vol. 44, 111302 (2005).

S. Skogstad et al., A Proposed Stability Characterization and Verification Method for High-Order Single-Bit Delta-Sigma Modulators, Norchip Conference, Nov. 2006 http://folk.uio.no/sayskogs/pub/A_Proposed_Stability_Characterization.pdf.

J. Turchi, Four Key Steps to Design a Continuous Conduction Mode PFC Stage Using the NCP1653, ON Semiconductor, Publication Order No. AND184/D, Nov. 2004.

Megaman, D or S Dimming ESL, Product News, Mar. 15, 2007.

J. Qian et al., New Charge Pump Power-Factor-Correction Electronic Ballast with a Wide Range of Line Input Voltage, IEEE Transactions on Power Electronics, vol. 14, No. 1, Jan. 1999.

P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.

J. Qian et al., Charge Pump Power-Factor-Correction Technologies Part II: Ballast Applications, IEEE Transactions on Power Electronics, vol. 15, No. 1, Jan. 2000.

Chromacity Shifts in High-Power White LED Systems due to Different Dimming Methods, Solid-State Lighting, http://www.lrc/rpi.edu/programs/solidstate/completedProjects.asp?ID=76, printed May 3, 2007.

S. Chan et al., Design and Implementation of Dimmable Electronic Ballast Based on Integrated Inductor, IEEE Transactions on Power Electronics, vol. 22, No. 1, Jan. 2007.

M. Madigan et al., Integrated High-Quality Rectifier-Regulators, IEEE Transactions on Industrial Electronics, vol. 46, No. 4, Aug. 1999.

T. Wu et al., Single-Stage Electronic Ballast with Dimming Feature and Unity Power Factor, IEEE Transactions on Power Electronics, vol. 13, No. 3, May 1998.

F. Tao et al., "Single-Stage Power-Factor-Correction Electronic Ballast with a Wide Continuous Dimming Control for Fluorescent Lamps," IEEE Power Electronics Specialists Conference, vol. 2, 2001.

Azoteq, IQS17 Family Switch®—ProxSense™ Series, Touch Sensor, Load Control and User Interface, IQS17 Datasheet V2.00.doc, Jan. 2007.

C. Dilouie, Introducing the LED Driver, EC&M, Sep. 2004.

S. Lee et al., TRIAC Dimmable Ballast with Power Equalization, IEEE Transactions on Power Electronics, vol. 20, No. 6, Nov. 2005.

L. Gonthier et al., EN55015 Compliant 500W Dimmer with Low-Losses Symmetrical Switches, 2005 European Conference Power Electronics and Applications, Sep. 2005.

Why Different Dimming Ranges? The Difference Between Measured and Perceived Light, 2000 http://www.lutron.com/ballast/pdf/LutronBallastpg3.pdf.

D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.

Light Dimmer Circuits, www.epanorama.net/documents/lights/lightdimmer.html, printed Mar. 26, 2007.

Light Emitting Diode, http://en.wikipedia.org/wiki/Light-emitting_diode, printed Mar. 27, 2007.

Color Temperature, www.sizes.com/units/color_temperature.htm, printed Mar. 27, 2007.

S. Lee et al., A Novel Electrode Power Profiler for Dimmable Ballasts Using DC Link Voltage and Switching Frequency Controls, IEEE Transactions on Power Electronics, vol. 19, No. 3, May 2004.

Y. Ji et al., Compatitibility Testing of Fluorescent Lamp and Ballast Systems, IEEE Transactions on Industry Application, vol. 35, No. 6, Nov./Dec. 1999.

National Lighting Product Information Program, Specifier Reports, "Dimming Electronic Ballasts," vol. 7, No. 3, Oct. 1999.

Supertex Inc., Buck-based LED Drivers Using the HV9910B, Application Note AN-H48, Dec. 28, 2007.

D. Rand et al., Issues, Models and Solutions for Triac Modulated Phase Dimming of LED Lamps, Power Electronics Specialists Conference, 2007.

Supertex Inc., HV9931 Unity Power Factor LED Lamp Driver, Application Note AN-H52, Mar. 7, 2007.

Supertex Inc., 56W Off-line LED Driver, 120VAC with PFC, 160V, 350mA Load, Dimmer Switch Compatible, DN-H05, Feb. 2007.

ST Microelectronics, Power Factor Corrector L6561, Jun. 2004.

Fairchild Semiconductor, Application Note 42047 Power Factor Correction (PFC) Basics, Rev. 0.9.0 Aug. 19, 2004.

M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.

M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.

Fairchild Semiconductor, FAN4800, Low Start-up Current PFC/PWM Controller Combos, Nov. 2006.

Fairchild Semiconductor, FAN4810, Power Factor Correction Controller, Sep. 24, 2003.

Fairchild Semiconductor, FAN4822, ZVS Average Current PFC Controller, Aug. 10, 2001.

Fairchild Semiconductor, FAN7527B, Power Factor Correction Controller, 2003.

Fairchild Semiconductor, ML4821, Power Factor Controller, Jun. 19, 2001.

Freescale Semiconductor, AN1965, Design of Indirect Power Factor Correction Using 56F800/E, Jul. 2005.

International Search Report for PCT/US2008/051072, mailed Jun. 4, 2008.

* cited by examiner

[R51=191kΩ][Toff=8.52µB]

SWITCHING POWER CONVERTER CONTROL WITH TRIAC-BASED LEADING EDGE DIMMER COMPATIBILITY

CROSS REFERENCE TO RELATED APPLICATIONS

This application claims priority under 35 U.S.C. §119(e) to U.S. Provisional Application No. 61/083,717, filed Jul. 25, 2008.

U.S. patent application Ser. No. 11/967,269, entitled "Power Control System Using a Nonlinear Delta-Sigma Modulator with Nonlinear Power Conversion Process Modeling," inventor John L. Melanson, and filed on Dec. 31, 2007 describes exemplary methods and systems and is incorporated by reference in its entirety. Referred to herein as Melanson I.

U.S. patent application Ser. No. 11/967,271, entitled "Power Factor Correction Controller with Feedback Reduction," inventor John L. Melanson, and filed on Dec. 31, 2007 describes exemplary methods and systems and is incorporated by reference in its entirety. Referred to herein as Melanson II.

U.S. patent application Ser. No. 11/967,273, entitled "System and Method with Inductor Flyback Detection Using Switch Date Charge Characteristic Detection," inventor John L. Melanson, and filed on Dec. 31, 2007 describes exemplary methods and systems and is incorporated by reference in its entirety. Referred to herein as Melanson III.

U.S. patent application Ser. No. 11/967,275, entitled "Programmable Power Control System," inventor John L. Melanson, and filed on Dec. 31, 2007 describes exemplary methods and systems and is incorporated by reference in its entirety. Referred to herein as Melanson IV.

U.S. patent application Ser. No. 11/967,272, entitled "Power Factor Correction Controller With Switch Node Feedback", inventor John L. Melanson, and filed on Dec. 31, 2007 describes exemplary methods and systems and is incorporated by reference in its entirety. Referred to herein as Melanson V.

BACKGROUND OF THE INVENTION

1. Field of the Invention

The present invention relates in general to the field of signal processing, and more specifically to a system and method that includes switching power converter control with triac-based leading edge dimmer compatibility.

2. Description of the Related Art

Power control systems often utilize a switching power converter to convert alternating current (AC) voltages to direct current (DC) voltages or DC-to-DC. Power control systems often provide power factor corrected and regulated output voltages to many devices that utilize a regulated output voltage. Switching power converters have been used as interfaces between triac-based dimmers and loads. The load can be virtually any load that utilizes converted power, such as one or more light emitting diodes (LEDs).

LEDs are becoming particularly attractive as main stream light sources in part because of energy savings through high efficiency light output and environmental incentives such as the reduction of mercury. LEDs are semiconductor devices and are driven by direct current. The lumen output intensity (i.e. brightness) of the LED approximately varies in direct proportion to the current flowing through the LED. Thus, increasing current supplied to an LED increases the intensity of the LED and decreasing current supplied to the LED dims the LED. Current can be modified by either directly reducing the direct current level to the white LEDs or by reducing the average current through duty cycle modulation.

Dimming a light source saves energy when operating a light source and also allows a user to adjust the intensity of the light source to a desired level. Many facilities, such as homes and buildings, include light source dimming circuits (referred to herein as "dimmers"). Power control systems with switching power converters are used to control constant current light sources. However, conventional dimmers, such as a triac-based dimmer, that are designed for use with resistive loads, such as incandescent light bulbs, often do not perform well when supplying a raw, phase modulated signal to a reactive load such as a switching power converter.

FIG. 1 depicts a power control system 100, which includes a switching power converter 102. Voltage source 101 supplies an AC supply voltage $V_{IN}$ to a triac-based dimmer 104. The voltage source 101 is, for example, a public utility, and the supply voltage $V_{IN}$ is, for example, a 60 Hz/110 V line voltage in the United States of America or a 50 Hz/220 V line voltage in Europe. Dimmer 104 receives the supply voltage $V_{IN}$ and generates a dimmer voltage $V_{\Phi\_DIM}$. During a dimming period, dimmer 104 phase modulates the supply voltage $V_{IN}$ by introducing phase delays α into the beginning of each half cycle of dimmer voltage $V_{\Phi\_DIM}$. "α" represents an amount of time between the beginning and leading edge of each half cycle of dimmer voltage $V_{\Phi\_DIM}$. ("Introducing phase delays" is also referred to as "chopping"). The portion of the dimmer voltage $V_{\Phi\_DIM}$ having a phase delay α is referred to as the "dimming portion". As subsequently described in more detail, the amount of phase delay α depends upon the amount of selected dimming. When dimmer 104 is not in a dimming period, i.e. dimmer 104 is not set to phase modulate the supply voltage $V_{IN}$, the phase delay α is zero, and dimmer 104 simply passes the supply voltage $V_{IN}$ to full bridge diode rectifier 103. Rectifier 103 rectifies the dimmer voltage $V_{\Phi\_DIM}$ and supplies a rectified, time-varying, line input voltage $V_{\Phi\_RECT}$ to the switching power converter 102.

The power control system 100 includes a PFC and output voltage controller 114 to control power factor correction and regulate an output voltage $V_{LINK}$ of switching power converter 102. The PFC and output voltage controller 114 controls an ON (i.e. conductive) and OFF (i.e. nonconductive) state of switch 108 by varying a state of pulse width modulated control signal $CS_0$. Switching between states of switch 108 regulates the transfer of energy from the rectified line input voltage $V_{\Phi\_RECT}$ through inductor 110 to capacitor 106. The inductor current $i_L$ ramps 'up' when the switch 108 is ON. The inductor current $i_L$ ramps down when switch 108 is OFF and supplies current $i_L$ to recharge capacitor 106. The time period during which inductor current $i_L$ ramps down is commonly referred to as the "inductor flyback time". During the inductor flyback time, diode 111 is forward biased. Diode 111 prevents reverse current flow into inductor 110 when switch 108 is OFF. In at least one embodiment, the switching power converter 102 operates in discontinuous current mode, i.e. the inductor current $i_L$ ramp up time plus the inductor flyback time is less than the period of the control signal $CS_0$. When operating in continuous conduction mode, the inductor current $i_L$ ramp-up time plus the inductor flyback time equals the period of control signal $CS_0$.

The switch 108 is a field effect transistor (FET), such as an n-channel FET. Control signal $CS_0$ is a gate voltage of switch 108, and switch 108 conducts when the pulse width of $CS_0$ is high. Thus, the 'ON time' of switch 108 is determined by the pulse width of control signal $CS_0$.

Capacitor 106 supplies stored energy to load 112. The capacitor 106 is sufficiently large so as to maintain a substantially constant output voltage $V_{LINK}$, as established by PFC and output voltage controller 114. As load conditions change, the output voltage $V_{LINK}$ changes. The PFC and output voltage controller 114 responds to the changes in output voltage $V_{LINK}$ and adjusts the control signal $CS_0$ to restore a substantially constant output voltage $V_{LINK}$ as quickly as possible. Power control system 100 includes a small, filter capacitor 115 in parallel with switching power converter 102 to filter any high frequency signals from the input voltage $V_{\Phi\_RECT}$.

The goal of power factor correction technology is to make the switching power converter 102 appear resistive to the voltage source 101. Thus, PFC and output voltage controller 114 attempts to control the inductor current $i_L$ SO that the average inductor current $i_L$ is linearly and directly related to the line input voltage $V_{\Phi\_RECT}$. Prodić, *Compensator Design and Stability Assessment for Fast Voltage Loops of Power Factor Correction Rectifiers*, IEEE Transactions on Power Electronics, Vol. 22, No. 5, September 2007, pp. 1719-1729 (referred to herein as "Prodić"), describes an example of PFC and output voltage controller 114.

In at least one embodiment, the values of the pulse width and duty cycle of control signal $CS_o$ depend on sensing two signals, namely, the input voltage $V_{\Phi\_RECT}$ and the capacitor voltage/output voltage $V_{LINK}$. PFC and output voltage controller 114 receives the input voltage $V_{\Phi\_RECT}$ and the output voltage $V_{LINK}$ respectively via a wide bandwidth current loop 116 and a slower voltage loop 118. The input voltage $V_{\Phi\_RECT}$ is sensed from node 120 between the diode rectifier 103 and inductor 110. The output voltage $V_{LINK}$ is sensed from node 122 between diode 111 and load 112. The current loop 116 operates at a frequency $f_c$ that is sufficient to allow the PFC and output voltage controller 114 to respond to changes in the line input voltage $V_{\Phi\_RECT}$ and cause the inductor current $i_L$ to track the input voltage $V_{\Phi\_RECT}$ to provide power factor correction. The current loop frequency is generally set to a value between 20 kHz and 130 kHz. The voltage loop 118 operates at a much slower frequency $f_v$, typically 10-20 Hz. By operating at 10-20 Hz, the voltage loop 118 regulates slow variations in the output voltage $V_{LINK}$ due to AC line voltage fluctuations in amplitude.

FIG. 2 (labeled prior art) depicts a triac-based power and dimming system 200 that includes a triac-based dimmer 202. Potentiometer 204 conducts current I to charge capacitor 206. During a dimming period, diac 208 blocks current to triac 210 until capacitor 206 reaches a breakover voltage of diac 208. When capacitor 206 reaches the breakover voltage, diac 208 conducts, and capacitor 206 discharges through diac 208. When capacitor 206 discharges, capacitor 206 supplies a current to triac 210, and triac 210 conducts. The time between when the supply voltage $V_{IN}$ crosses zero and when the triac 210 conducts represents the phase delay α of dimmer voltage $V_{\Phi\_DIM}$. The resistance of potentiometer 204 sets the value of phase delay α. The resistance R of potentiometer 204 and capacitance C of capacitor 206 form an RC time constant that determines a phase delay α (FIG. 3) of dimmer voltage $V_{DIM}$. Increasing R increases the phase delay α, and decreasing R decreases the phase delay α. When R is decreased sufficiently, the phase delay α is essentially zero, and, thus, $V_{\Phi\_DIM}=V_{IN}$. The value of R is set by potentiometer 204. The value of C and the range of R are matters of design choice.

When the phase delay α is zero, dimmer 202 stops dimming. In at least one embodiment, when dimmer 202 is dimming and the supply voltage $V_{IN}$ reaches 0, diac 208 and triac 210 stop conducting. When dimming, the alternating conduction/nonconduction of triac 210 modulates the phase of the supply voltage $V_{IN}$. Resistor 214, capacitor 216, and inductor 218 provide high frequency rejection for dimmer 202.

Referring to FIGS. 1 and 2, controller 114 operates switch 108 to provide power factor correction so that input current $i_L$ tracks changes in input voltage $V_{\Phi\_RECT}$. In at least one embodiment, when the input voltage $V_{\Phi\_RECT}$ approaches a zero crossing, a very low input resistance is presented. Presenting a very low input resistance to a triac-based dimmer 104 can cause the triac 210 to turn ON and OFF multiple times during a single half cycle of input voltage $V_{\Phi\_RECT}$. As discussed in more detail below, oscillations in the conduction of triac 210 during a single half cycle of input voltage $V_{\Phi\_RECT}$ can cause problems, such as flicker in a lamp when load 112 includes a lamp.

FIG. 3 depicts a series of ideal voltage waveforms 300 that represent two respective cycles of waveforms present in an ideal power and dimming system 200 during two dimming periods. Referring to FIGS. 1, 2, and 3, supply voltage $V_{IN}$ is a sine wave depicted with two exemplary cycles 302 and 304. Dimmer 104 generates the phase modulated voltage $V_{\Phi\_DIM}$ by chopping each half cycle of supply voltage $V_{IN}$ to ideally generate one, leading edge phase delay α1 for each respective half cycle of cycle 306. The phase delays α of the phase modulated signal $V_{\Phi\_DIM}$ increase as the dimming level increases, i.e. as phase delays α increase, less power is delivered to load 112. If load 112 is a lamp, dimming level increases correspond to decreases in brightness of the lamp. Half cycle 308 indicates a longer phase delay α2 corresponding to a decrease in dimming level. The exemplary leading edge phase delays α1 and α2 represent the elapsed time between a beginning of a half cycle and a leading edge of dimmer voltage $V_{\Phi\_DIM}$. The cycles 310 and 312 of rectified input voltage $V_{\Phi\_RECT}$ have the same respective phase delays α1 and α2 as the phase modulated signal $V_{\Phi\_DIM}$. The phase delayed portions of voltages $V_{\Phi\_DIM}$ and $V_{\Phi\_RECT}$ represented by α1 and α2 are also referred to as the "dimming portion" of voltages $V_{\Phi\_DIM}$ and $V_{\Phi\_RECT}$.

As previously mentioned, conventional dimmers, such as triac-based dimmer 202, that are designed for use with resistive loads, such as incandescent light bulbs, often do not perform well when supplying a phase modulated signal $V_{\Phi\_DIM}$ to a reactive load such as switching power converter 102. For example, when supplying a reactive load, the dimmer 202 can miss generating phase delays in some cycles of phase modulated signal $V_{\Phi\_DIM}$ and can generate ripple during the phase delays. Exemplary problems with at least one conventional triac-based dimmer when used with a reactive load are described in Rand et al., "Issues, Models and Solutions for Triac Modulated Phase Dimming of LED Lamps", June, 2007, pages 1398-1404 of Power Electronics Specialists Conference, 2007. PESC 2007, published by the Institute of Electrical and Electronic Engineers, ISBN 978-1-4244-0655-5. Thus, although the rectified input voltage $V_{\Phi\_RECT}$ ideally has one phase delay per cycle during dimming, when driving a reactive load, such as a switching power converter 102, problems such as missing phase delays and multiple phase delays α in a single half cycle of the rectified input voltage $V_{\Phi\_RECT}$ exist.

Although minor ripple may be present during the dimming portion of the input voltage $V_{\Phi\_RECT}$, the multiple phase delays α during a single half cycle of input voltage $V_{\Phi\_RECT}$ cause significant interruptions in the initial phase delay α of the input voltage $V_{\Phi\_RECT}$. In at least one embodiment, triac 210 (FIG. 2) turning ON and OFF multiple times during a single half cycle of input voltage $V_{\Phi\_RECT}$ causes the significant interruptions in the initial phase delay α of the input voltage $V_{\Phi\_RECT}$. When triac 210 (FIG. 2) turns ON and OFF multiple times during a dimming portion of a half cycle of input voltage $V_{\Phi\_RECT}$, the input voltage $V_{\Phi\_RECT}$ increases and decreases multiple times during the dimming portion of the half cycle of input voltage $V_{\Phi\_RECT}$. Multiple oscillations of the input voltage $V_{\Phi\_RECT}$ during a half cycle of the input voltage $V_{\Phi\_RECT}$ can cause problems such as flicker of a lamp load.

Conventional solutions to the problem of interfacing a triac-based dimmer with a reactive switching power converter 102 involve adding additional components to, for example, discharge the filter capacitor 115 during the dimming portion of dimmer voltage $V_{\Phi\_DIM}$.

FIGS. 4A and 4B (collectively referred to as FIG. 4) depict an LED driver circuit 400 available from Supertex, Inc. of Sunnyvale, Calif., USA. LED driver circuit 400 represents one embodiment of light source driver circuit 106. The LED driver circuit 400 is described in more detail in Supertex design note DN-H05 available from Supertex, Inc. The LED driver circuit 400 includes two extra circuits, damper circuit 402 and bleeder circuit 404 to provide compatibility with a dimmer, such as dimmer 104. According to DN-H05, the damper circuit 402 provides damped charging of the driver's input filter circuit at P16. The damper circuit 402 provides resistive damping to prevent AC line input current oscillations due to a sudden rise of an AC line voltage, such as the edges of dimmer voltage $V_{\Phi\_DIM}$. The bleeder circuit 404 provides a nominal 1 kohm load to a rectified AC line at P21 to suppress a voltage rise at the input capacitors C21-C23 due to leakage current of diac 208 and triac 210 (FIG. 2) during dimming portions of dimmer voltage $V_{\Phi\_DIM}$ which could otherwise cause flicker of a lamp driven by LED driver circuit 400.

FIG. 5 depicts a unity power factor LED lamp driver 500, which represents one embodiment of light source driver circuit 106. The LED lamp driver 500 is described in more detail in Supertex application note AN-H52 available from Supertex, Inc. LED lamp driver 500 includes damping circuitry 502 to add a load to dimmer 104 during dimming portions of the dimmer voltage $V_{\Phi\_DIM}$. The damping circuitry 502 includes a bleeder resistor $R_{BL}$ that is connected by transistor M2 during the dimming portions of dimmer voltage $V_{\Phi\_DIM}$ to lamp driver 500. When transistor M2 conducts, the bleeder resistor $R_{BL}$ provides an added load to the AC line at $V_{IN}$ to dampen the dimmer voltage $V_{\Phi\_DIM}$ during dimming portions. Adding an extra transistor M2 and resistor $R_{BL}$ increases the system cost of lamp driver 500.

It would be desirable to reduce or eliminate the extra components of LED driver circuit 400 and LED lamp driver 500 that provide a load to dimmer 104 during the dimming portion of dimmer voltage $V_{\Phi\_DIM}$. It would also be desirable to reduce or eliminate the power consumption of resistive loads added by LED driver circuit 400 and LED lamp driver 500 that provide a load to dimmer 104 during the dimming portion of dimmer voltage $V_{\Phi\_DIM}$.

SUMMARY OF THE INVENTION

In one embodiment of the present invention, a controller is configured to control a switching power converter and provide compatibility between the switching power converter and a triac-based dimmer. The switching power converter includes a switch to control voltage conversion of an input voltage to the switching power converter. The controller includes one or more components to control the switch of the switching power converter to establish an input resistance of the switching power converter during a dimming portion of the input voltage. The input resistance allows the triac-based dimmer to generate a phase modulated input voltage to the switching power converter having a substantially uninterrupted phase delay during each half-cycle of the input voltage during a dimming period.

In another embodiment of the present invention, a method to control a switching power converter and provide compatibility between the switching power converter and a triac-based dimmer, wherein the switching power converter includes a switch to control voltage conversion of an input voltage to the switching power converter, includes controlling the switch of the switching power converter to establish an input resistance of the switching power converter during a dimming portion of the input voltage. The input resistance allows the triac-based dimmer to generate a phase modulated input voltage to the switching power converter having a substantially uninterrupted phase delay during each half-cycle of the input voltage during a dimming period.

In a further embodiment of the present invention, an electronic system includes a switching power converter to convert an input voltage to the switching power converter. The switching power converter includes a switch to control voltage conversion of the input voltage to the switching power converter into the output voltage. The input voltage to the switching power converter is phase modulated during dimming periods by a triac-based dimmer. The electronic system also includes a controller, coupled to the switching power converter, to control the switch of the switching power converter to establish an input resistance of the switching power converter during a dimming portion of the input voltage. The input resistance allows the triac-based dimmer to generate a phase modulated input voltage to the switching power converter having a substantially uninterrupted phase delay during each half-cycle of the input voltage during a dimming period.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
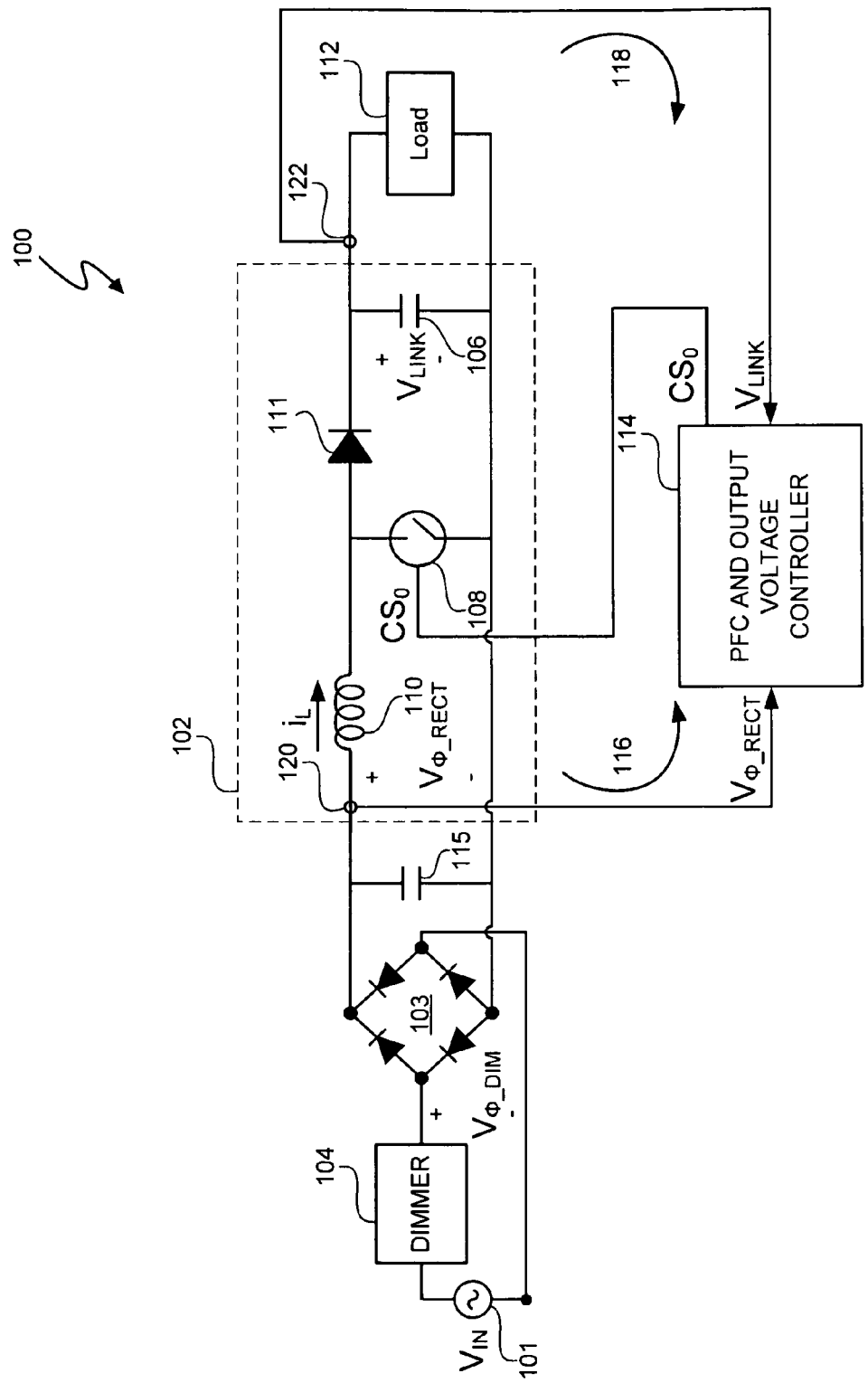
FIG. 1 (labeled prior art) depicts a power control system having a switching power converter.
Figure 2:
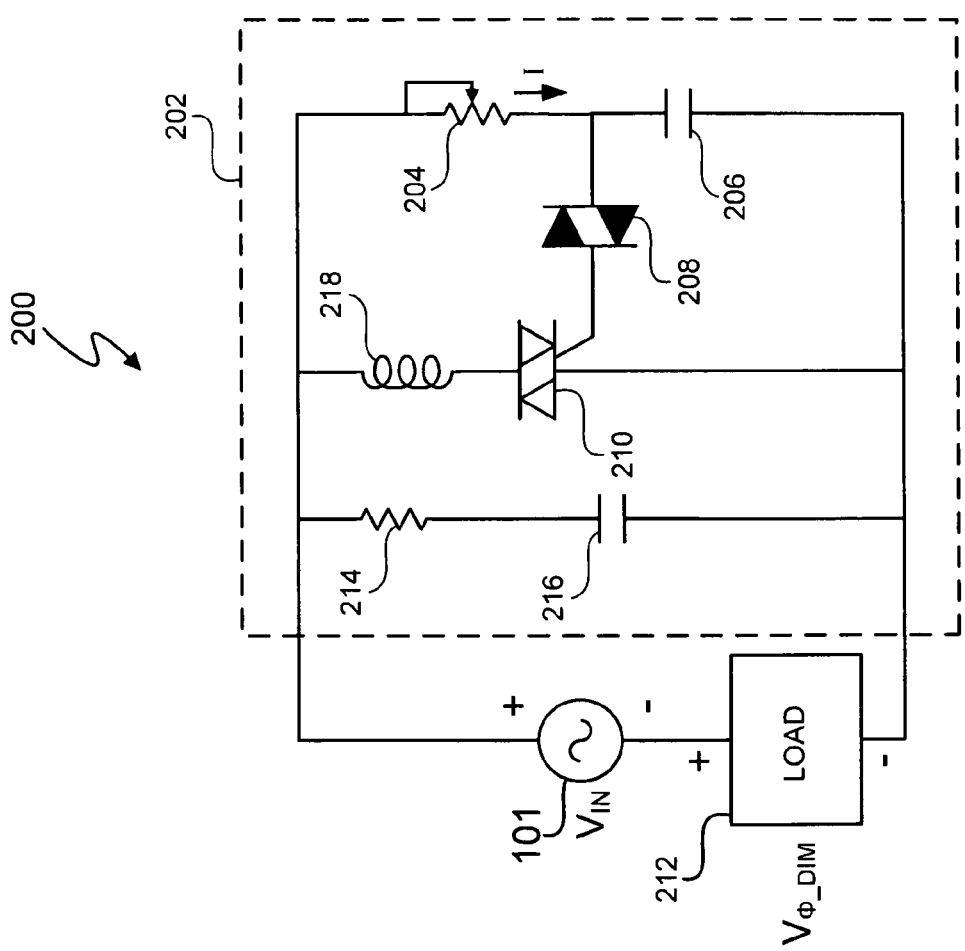
FIG. 2 (labeled prior art) depicts a triac-based power and dimming system.

In at least one embodiment, a controller allows triac-based dimmer to properly function and dim a load whose voltage is regulated by a switching power converter. In at least one embodiment, the switching power converter includes a switch to control voltage conversion of an input voltage to the switching power converter, wherein phase delays are introduced in the input voltage by a triac-based dimmer during a dimming period. In at least one embodiment, the controller is configured to control the switch of the switching power converter to establish an input resistance of the switching power converter during a dimming portion of the input voltage, wherein the input resistance allows the triac-based dimmer to phase modulate a supply voltage to the dimmer to generate a dimmer output voltage having a substantially uninterrupted phase delay during each half-cycle of the supply voltage during the dimming period. In at least one embodiment, the input resistance allows the triac-based dimmer to phase modulate the supply voltage so that the output voltage of the dimmer has a single, uninterrupted phase delay during each half cycle of the input voltage. In at least one embodiment, phase modulating the supply voltage introduces a leading edge phase delay in each cycle of the input voltage, and each phase delay has a duration of less than one-half of the period of each cycle of the input voltage.

In at least one embodiment, the controller has two modes of operation, a power factor correction (PFC) mode and a maintenance mode. In at least one embodiment, the maintenance mode has an active maintenance mode, and, in at least one embodiment, the maintenance mode has both the active maintenance mode and a quiet maintenance mode. In the PFC mode, the controller controls the switching power converter to provide power factor correction and voltage regulation. When the input voltage to the switching power converter is below a first threshold voltage, the controller enters the active maintenance mode. In at least one embodiment, when the input voltage further drops below a second threshold voltage, the controller enters a quiet maintenance mode.

In the maintenance mode, the controller sets an operational frequency and pulse width of a control signal that respectively controls a switching frequency and ON time of the switching power converter switch so that an input resistance to the triac-based dimmer allows the dimmer to phase modulate the supply voltage during each half-cycle of the supply voltage during the dimming period. In at least one embodiment, the switching power converter includes a filter capacitor across input terminals of the switching power converter. In the maintenance mode, the controller controls the input resistance of the switching power converter to allow the filter capacitor to discharge sufficiently to allow the triac-based dimmer to phase modulate the supply voltage during each half-cycle of the input voltage during the dimming period with a substantially uninterrupted phase delay. In at least one embodiment, the dimming period is substantially uninterrupted when the triac of the triac-based dimmer does not include multiple oscillations between conduction and nonconduction during each half cycle of the input voltage. In at least one embodiment, when the input voltage to the switching power converter further decreases below a second predetermined threshold, the controller ceases operating the switch until the input voltage increases above the first predetermined threshold.

Figure 6:
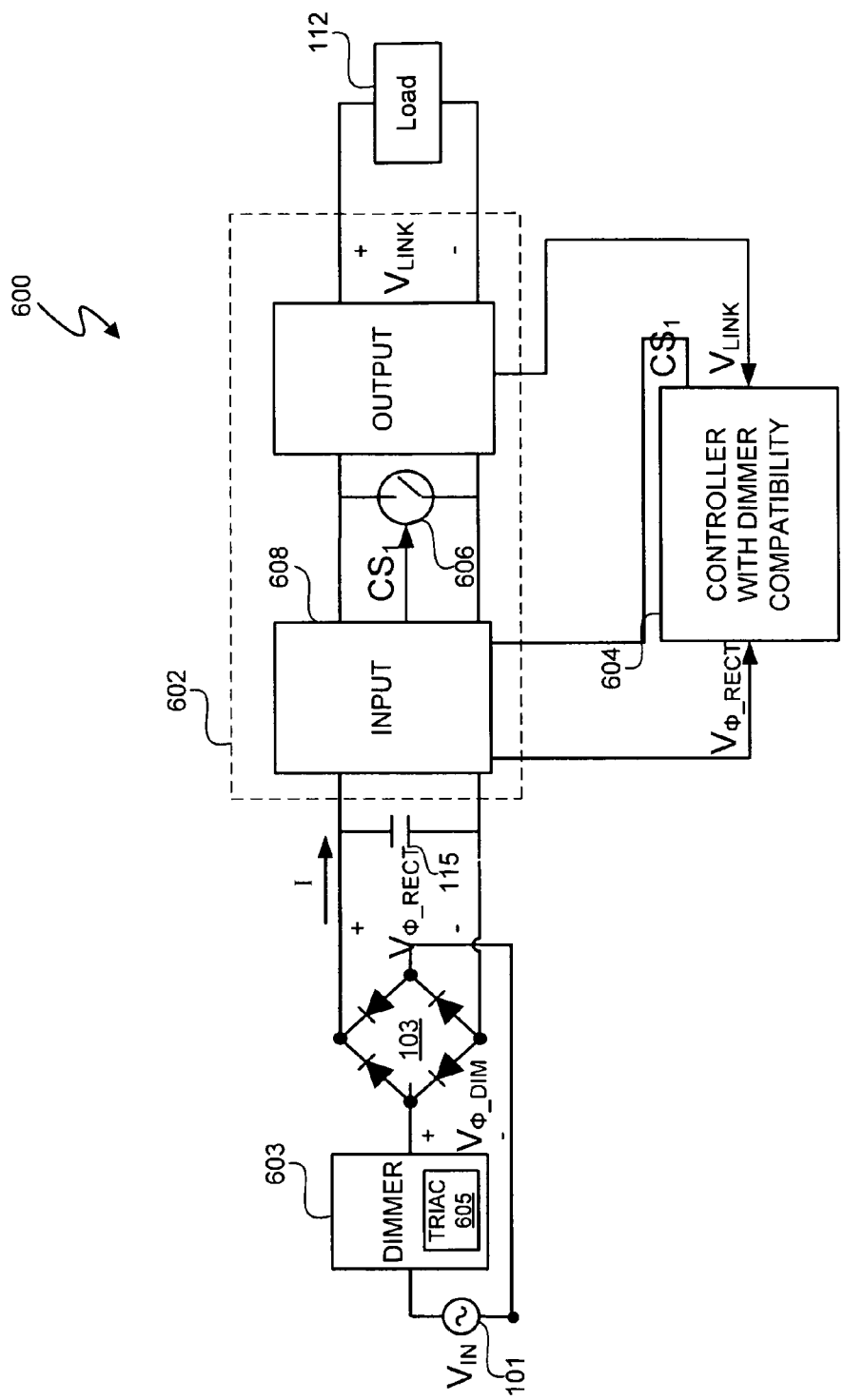
FIG. 6 depicts a power system, which includes a switching power converter controlled by controller with dimmer compatibility.

FIG. 6 depicts power system 600, which includes a switching power converter 602 controlled by controller 604 with dimmer compatibility. Voltage source 101 and triac-based dimmer 603 generate the phase modulated dimmer voltage $V_{\Phi\_DIM}$ as previously described. Dimmer 603 includes triac 605, and, in at least one embodiment, dimmer 603 and triac 605 are respectively configured identically to dimmer 202 and triac 210. Full bridge diode rectifier 103 rectifies dimmer voltage $V_{\Phi\_DIM}$ to generate the rectified input voltage $V_{\Phi\_RECT}$ to the switching power converter 602. Filter capacitor 115 provides, for example, high frequency filtering of the rectified input voltage $V_{\Phi\_RECT}$. Switching power converter 602 converts the input voltage $V_{\Phi\_RECT}$ into a regulated output voltage $V_{LINK}$ to supply a voltage to load 112. Load 112 can be any type of load including a load having one or more LEDs. The particular configuration of input section 608 and output section 610 is a matter of design choice. The switching power converter 602 can be any kind of switching power converter 602, such as a buck converter, boost converter, boost-buck converter, and a Cúk converter.

Controller 604 generates switch control signal CS, to control conductivity of switch 606. In at least one embodiment, switch 606 is identical to switch 108 (FIG. 1). Controller 604 monitors the input voltage $V_{\Phi\_RECT}$ and the link voltage $V_{LINK}$. Controller 604 controls switch 606 to provide power factor correction and regulate link voltage $V_{LINK}$. During PFC mode, controller 604 provides power factor correction for switching power converter 602 after any phase delay α of input voltage $V_{\Phi\_RECT}$. (A phase delay α of 0 indicates an absence of dimming). Control of power factor correction and the output voltage $V_{OUT}$ of switching power converter 102 is, for example, described in the exemplary embodiments of Melanson I, II, III, IV, and V.

Figure 3:
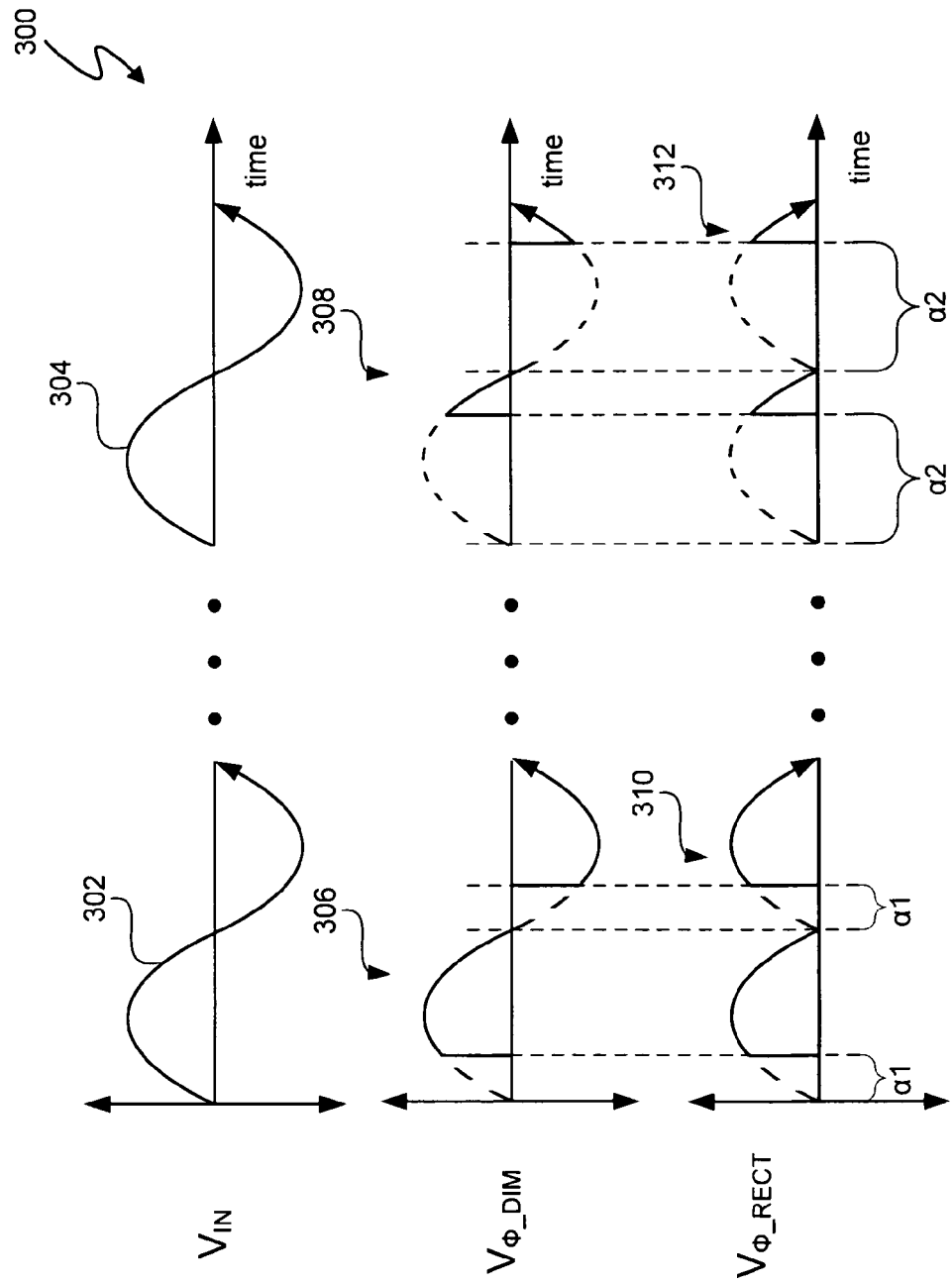
FIG. 3 (labeled prior art) depicts a series of ideal voltage waveforms that represent two respective cycles of waveforms present in an ideal power and dimming system of FIG. 2.
Figure 4A:
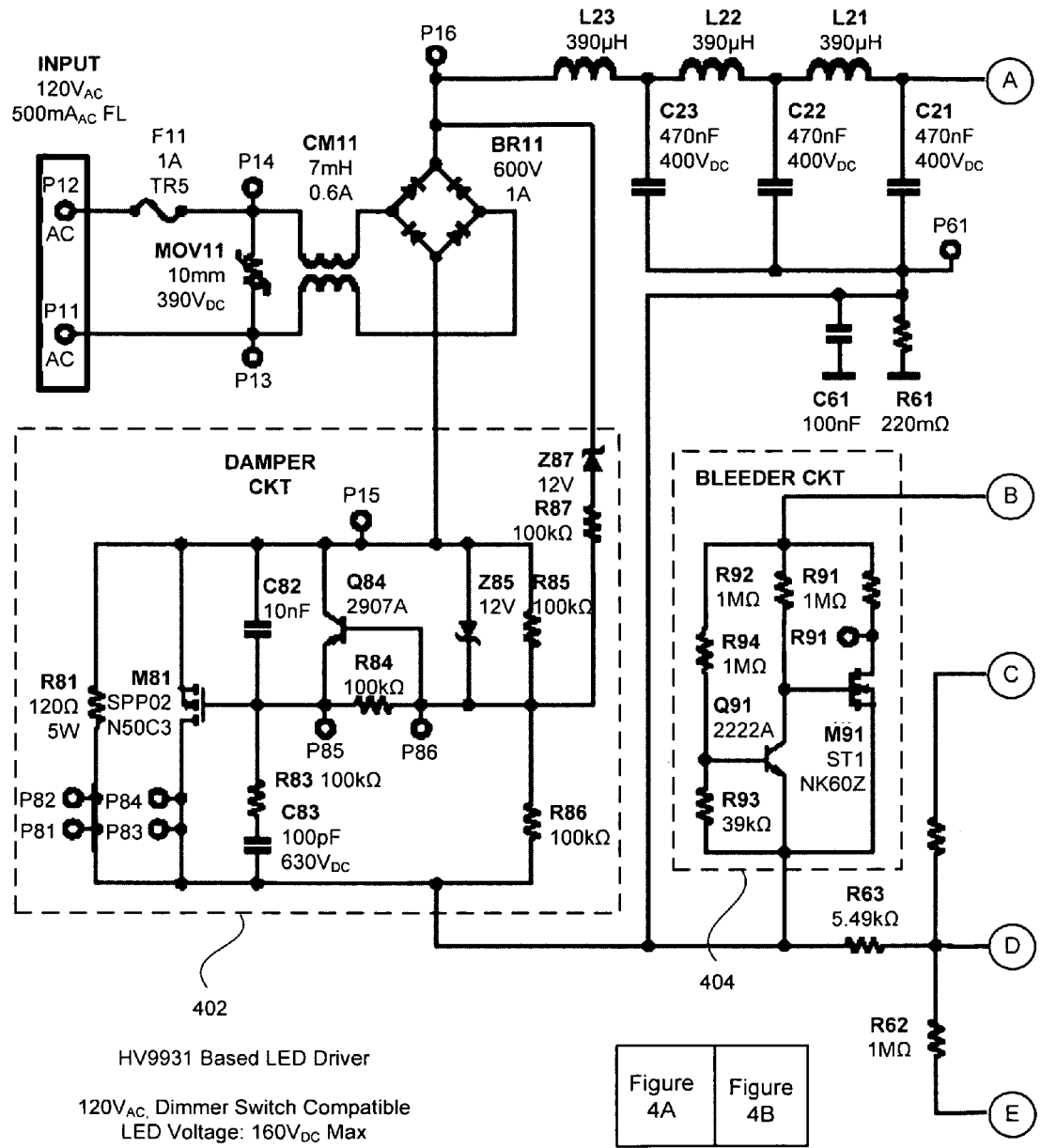
FIGS. 4A and 4B (collectively referred to as FIG. 4) (labeled prior art) depict an LED driver circuit with resistive damping.
Figure 4B:
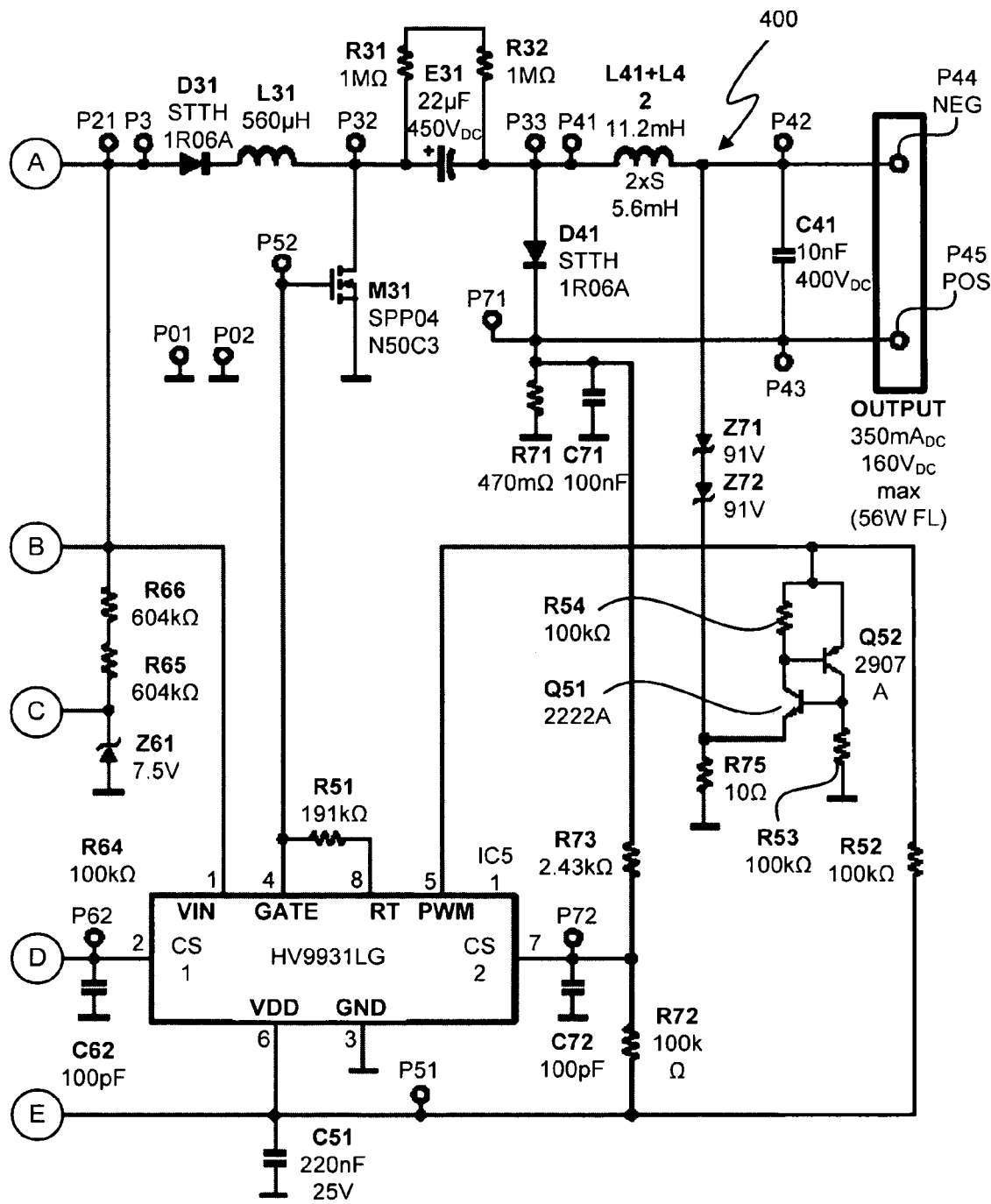
Figure 5:
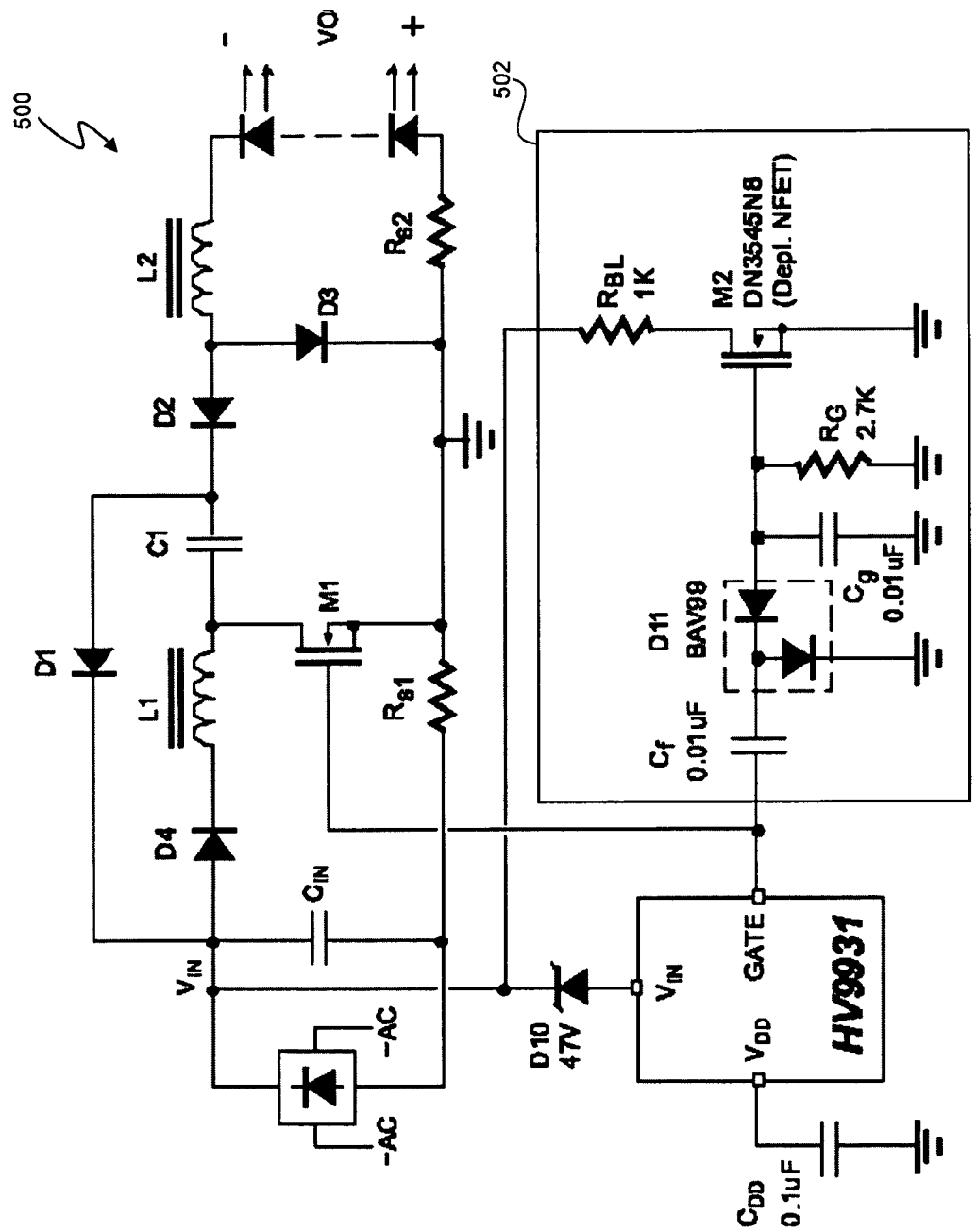
FIG. 5 (labeled prior art) depicts a unity power factor LED lamp driver with resistive damping.

During a dimming portion of input voltage $V_{\Phi\_RECT}$, controller 604 controls switch 606 so that switching power converter 602 has an input resistance that allows sufficient current to flow through triac 605. Allowing sufficient current to flow through triac 605 allows the triac 605 to properly operate. In at least one embodiment, proper operation of dimmer 603 occurs when dimmer 603 is set to provide a phase delay in input voltage $V_{\Phi\_RECT}$ and dimmer 603 phase supply voltage $V_{IN}$ to generate an input voltage $V_{\Phi\_RECT}$ with a substantially uninterrupted phase delay during each half cycle of input voltage $V_{\Phi\_RECT}$ during a dimming period. Exemplary waveforms of voltages $V_{\Phi\_DIM}$ and $V_{\Phi\_RECT}$ indicating proper operation of dimmer 603 are set forth in FIG. 3. In at least one embodiment, proper operation of triac 605 includes preventing the triac 605 from oscillating during subsequent dimming periods.

In at least one embodiment, controller 604 has two modes of operation, PFC mode and maintenance mode. In at least one embodiment, the maintenance mode has two modes of operation, the active maintenance mode and the quiet maintenance mode. During any phase delay α of input voltage $V_{\Phi\_RECT}$, controller 604 operates in maintenance mode. During maintenance mode, controller 604 causes switching power converter 602 to have an input resistance that allows dimmer 603 to generate a phase modulated input voltage $V_{\Phi\_RECT}$ with a substantially uninterrupted phase delay α during each half-cycle of the input voltage $V_{\Phi\_RECT}$ during the dimming period. In at least one embodiment, controller 604 establishes an input resistance $R_{EFF}$ during the maintenance mode that allows the triac-based dimmer 603 to phase modulate the supply voltage $V_{IN}$ so that input voltage $V_{\Phi\_RECT}$ has a single, uninterrupted phase delay during each half cycle of the input voltage $V_{\Phi\_RECT}$. In at least one embodiment, phase modulating the supply voltage $V_{IN}$ introduces a leading edge phase delay α in each cycle of the input voltage $V_{\Phi\_RECT}$, and each phase delay α has a duration of less than one-half of the period of each cycle of the input voltage $V_{\Phi\_RECT}$.

During PFC mode, the switching frequency of switch 606 is nominally 40 kHz -120 kHz. However, switching at such high frequencies during a phase delay of input voltage $V_{\Phi\_RECT}$ is inefficient because very little voltage is presented to the load 112 during the phase delay of input voltage $V_{\Phi\_RECT}$. Thus, power is consumed by switch 606 with very little power delivered to load 112.

Figure 7:
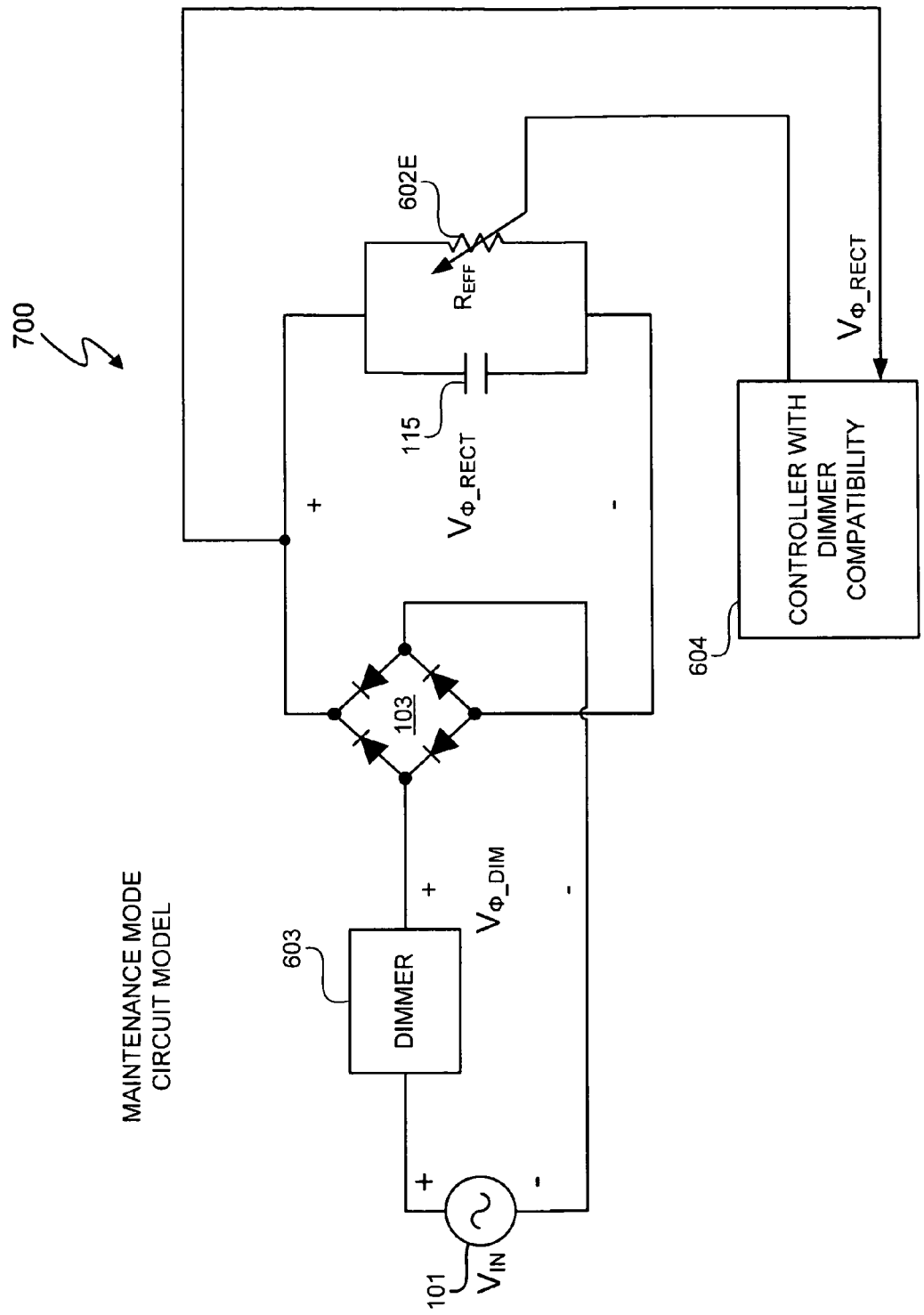
FIG. 7 depicts a circuit model of the power system of FIG. 6 when the controller operates in maintenance mode.

FIG. 7 depicts a circuit model 700 of power system 600 when controller 604 operates in maintenance mode. Referring to FIGS. 6 and 7, in maintenance mode, controller 604 generates control signal $CS_1$ so that the input impedance of switching power converter 602 appears as a resistive load 602E having an effective resistance $R_{EFF}$. The effective resistance $R_{EFF}$ of load 602E is a matter of design choice. In at least one embodiment, the effective resistance $R_{EFF}$, as established by controller 604, provides a sufficient discharge path for capacitor 115 to allow current to keep the triac 605 conducting during the dimming portion of voltage $V_{\Phi\_DIM}$. In at least one embodiment, controller 604 causes switch 606 to switch as slowly as possible to establish an effective resistance $R_{EFF}$ that allows the triac of dimmer 603 to properly operate. In at least one embodiment, controller 604 establishes the effective resistance $R_{EFF}$ to be between 2 kohms and 5 kohms.

Although the effective resistance $R_{EFF}$ appears as an actual resistance to dimmer 603, effective resistance $R_{EFF}$ does not dissipate energy as a physical resistor does. Instead, charge from the input current I is eventually transferred to load 112.

Figure 8:
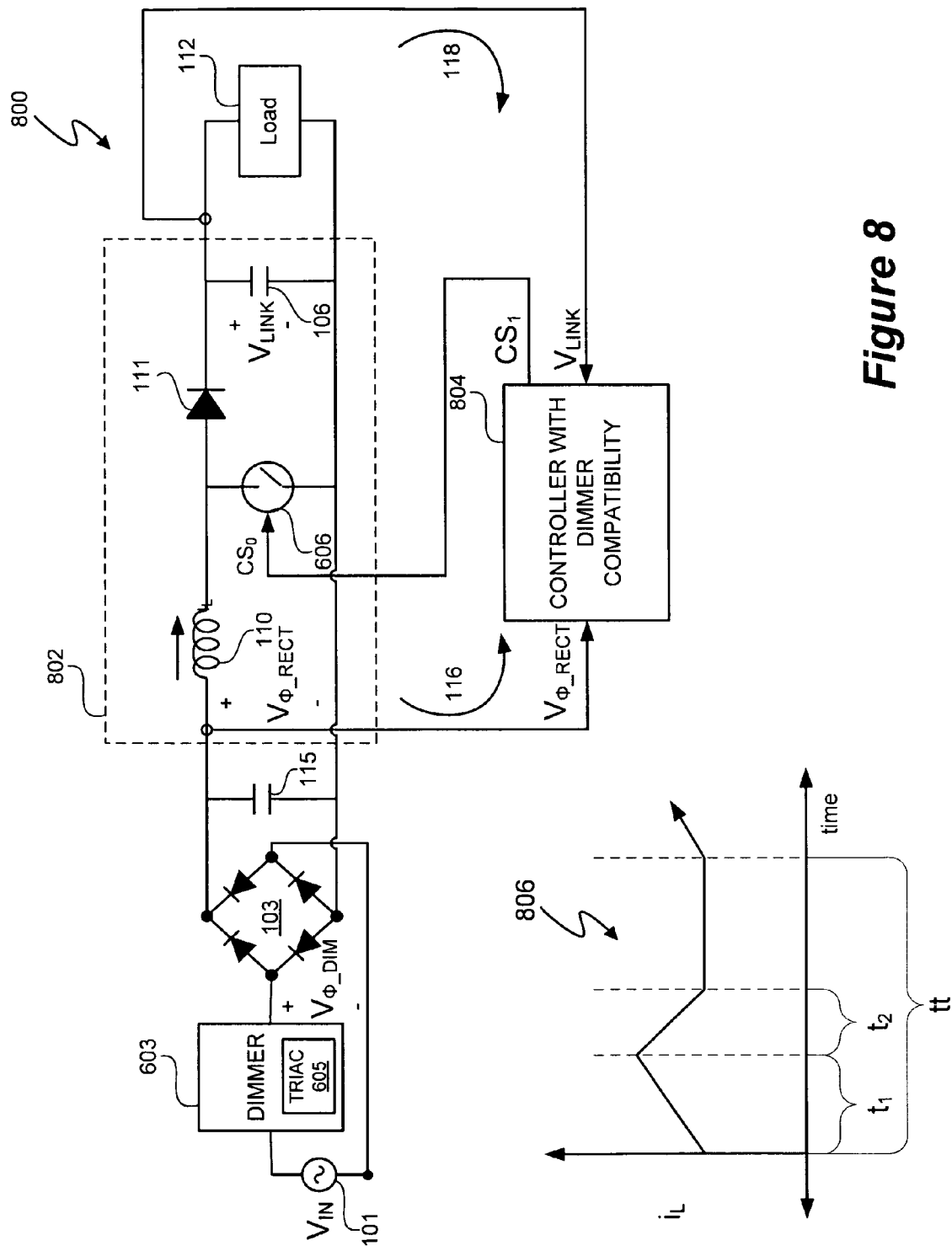
FIG. 8 depicts a power system, which is one embodiment of the power system of FIG. 6.

FIG. 8 represents power system 800, and power system 800 represents one embodiment of power system 600. Power system 800 includes a switching power converter 802, and, in one embodiment is identical to switching power converter 102. Power system 800 also includes controller 804 with dimmer compatibility. Controller 804 operates in maintenance mode in the dimming portion of input voltage $V_{\Phi\_RECT}$ and otherwise operates in PFC mode.

Signal plot 806 depicts input current $i_L$ during one period tt of control signal $CS_1$ with switching power converter 802 operating in discontinuous conduction mode. During a dimming portion of input voltage $V_{\Phi\_RECT}$, controller 804 operates in maintenance mode. In at least one embodiment, when operating in maintenance mode, controller 804 operates in the active maintenance mode. In at least one embodiment, when operating in maintenance mode, controller 804 operates in the active maintenance mode or the quiet maintenance mode during the dimming portion of input voltage $V_{\Phi\_RECT}$ depending upon a value of the input voltage $V_{\Phi\_RECT}$.

In at least one embodiment, when operating in the active maintenance mode, controller 804 establishes a switching frequency $f_{sw}$ and amount of conduction time $t_1$ of switch 606 to present an effective resistance $R_{EFF}$ to dimmer 603. Switching frequency $f_{sw}=1/tt$. In at least one embodiment, controller 804 determines an average of input current $i_L$ ($I_{L\_avg}$) for a given value of input voltage $V_{\Phi\_RECT}$ to determine the value of effective resistance $R_{EFF}$. The effective resistance $R_{EFF}$ is related to the average input current $I_{L\_avg}$ and the value of input voltage $V_{\Phi\_RECT}$ by Ohm's law in Equation [1]:

$$R_{EFF} = V_{\Phi\_RECT}/I_{L\_avg} \quad [1]$$

When switch 606 conducts for $t_1$ seconds, the input current $i_L$ increases. After $t_1$ seconds, input current $i_L$ decreases for $t_2$ seconds. This pattern repeats for each period of tt seconds. In at least one embodiment, for a given pulse width $t_1$ and period tt of control signal $CS_1$, the average input current $i_L$ is derived and set forth in Equation [2]:

$$I_{L\_avg} = \frac{V_{\Phi\_RECT} * t_1^2 * \left(1 + \frac{V_{\Phi\_RECT}}{V_{LINK} - V_{\Phi\_RECT}}\right)}{2 * tt * L} \quad [2]$$

$I_{L\_avg}$ represents the average input current $i_L$, $V_{\Phi\_RECT}$ represents the rectified input voltage to switching power converter 802, $V_{LINK}$ represents the output voltage of switching power converter 802, $t_1$ represents the pulse width of control signal $CS_1$ and, thus, the conduction time of switch 606, tt represents the period of control signal $CS_1$, and L represents the inductance of inductor 110.

From Equations [1] and [2], the effective resistance $R_{EFF}$ is set forth in Equation [4]:

$$R_{EFF} = \frac{2 * tt * L}{t_1^2 * \left(1 + \frac{V_{\Phi\_RECT}}{V_{LINK} - V_{\Phi\_RECT}}\right)} \quad [4]$$

If $V_{\Phi\_RECT} \ll V_{LINK}$, the effective resistance $R_{EFF}$ is approximated by Equation [5]:

$$R_{EFF} = \frac{2 * tt * L}{t_1^2} \quad [5]$$

Rearranging Equation [5] yields Equation [6], which solves for the pulse width $t_1$ of control signal $CS_1$ in terms of the period of control signal $CS_1$, the inductance value L of inductor 110, and the effective resistance $R_{EFF}$ of switching power converter 802:

$$t_1 = \sqrt{\frac{2 * tt * L}{R_{EFF}}} \quad [6]$$

Thus, in at least one embodiment, when operating in the active maintenance mode, controller 804 sets a value for the period of control signal $CS_1$ and utilizes Equation [6] to calculate a pulse width $t_1$ of control signal $CS_1$, i.e. an amount of conduction time $t_1$ of switch 606, to present an effective resistance $R_{EFF}$ to dimmer 603. Equation [5] can also be rearranged to determine a period tt of control signal $CS_1$ based upon a pulse width $t_1$. The particular inductance value L of inductor 110 is a matter of design choice. In one embodiment, an effective resistance value $R_{EFF}$ of 5 kohms is sufficient to discharge capacitor 115 and allow the triac of dimmer 603 to operate properly. For a period tt of 0.5 msec and a 1 mH value for inductor L, to achieve an effective resistance $R_{EFF}$ of 5 kohms, controller 804 determines $t_1$ to be approximately 14 μsec.

In at least one embodiment, the inductance value of inductor L, the period tt of control signal $CS_1$, and the pulse width $t_1$ of control signal $CS_1$ are preset in a memory (not shown) of controller 804 in accordance with the relationship in Equation [5]. Presetting the values of L, tt, and $t_1$ eliminates a need for controller 804 to determine the values and/or actually calculate the pulse width $t_1$.

Thus, in at least one embodiment, controller 804 can set the period tt and pulse width $t_1$ of control signal $CS_1$ using, for example, preset determinations of period tt and pulse width $t_1$. In at least one embodiment, controller 804 can calculate values of period tt and pulse width $t_1$.

In at least one embodiment, controller 804 dithers the value of period tt and pulse width $t_1$ to mitigate electromagnetic interference. In at least one embodiment, when dithering, controller 804 stores multiple values of period tt and values of pulse width $t_1$ in accordance with Equation [5] and utilizes the values of period tt and pulse width $t_1$ in accordance with a dithering algorithm. The dithering algorithm is a matter of design choice and is, for example, a pseudo-random selection algorithm. The exact manner of storing and/or determining the values of variables and results in Equation [4] and/or Equation [5] are a matter of design choice.

The particular implementation of controller 804 is a matter of design choice. Controller 804 can be implemented using analog, digital, or analog and digital components.

Figure 9:
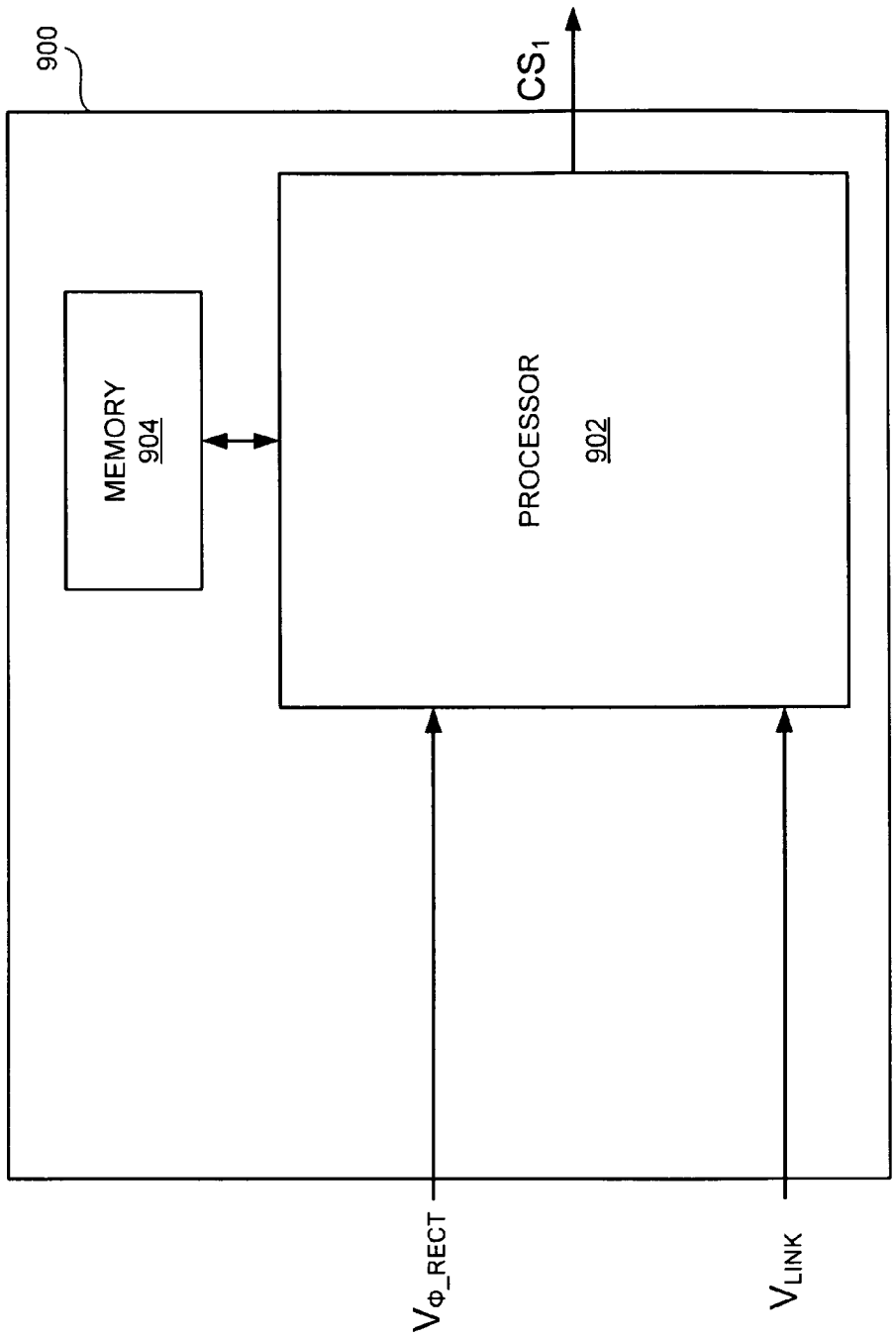
FIG. 9 depicts an embodiment of a controller in the power system of FIG. 8.
Figure 10:
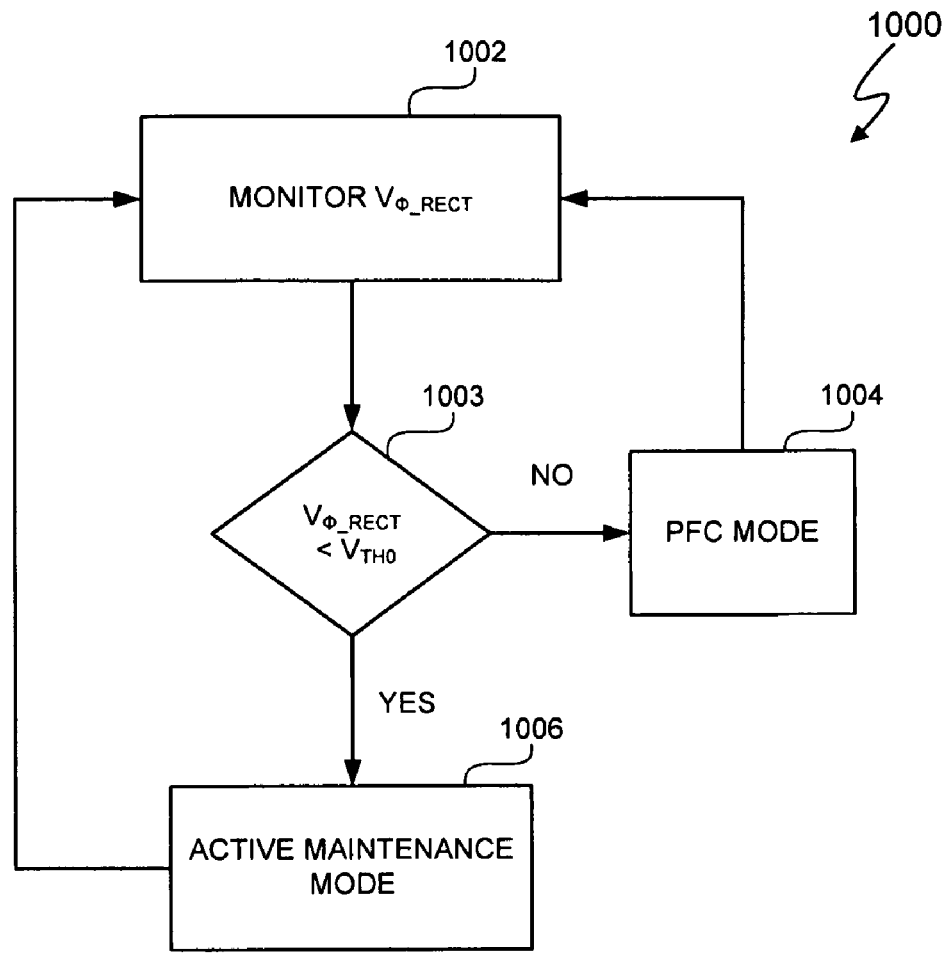
FIG. 10 depicts an exemplary triac compatibility algorithm.

FIG. 9 depicts controller 900, and controller 900 represents one embodiment of controller 804. FIG. 10 depicts an exemplary triac compatibility algorithm 1000 executed by controller 900 that determines whether controller 900 operates in PFC mode or the active maintenance mode. Referring to FIGS. 9 and 10, controller 900 includes a processor 902 configured to execute code stored in memory 904. In at least one embodiment, the code stored in memory 904 implements triac compatibility algorithm 1000.

In operation 1002, processor 902 monitors the input voltage $V_{\Phi\_RECT}$. In operation 1003, if input voltage $V_{\Phi\_RECT}$ is greater than or equal to active mode threshold voltage $V_{TH0}$, controller 900 operates in PFC mode 1004 until operation 1002 determines that input voltage $V_{\Phi\_RECT}$ is less than the active mode threshold voltage $V_{TH0}$. If $V_{\Phi\_RECT}$ is less than active mode threshold voltage $V_{TH0}$, then controller 900 operates in active maintenance mode 1006. Controller 900 can be implemented in any of a variety of ways. In at least one embodiment, controller 900 includes an analog-to-digital converter (ADC) to convert the input voltage $V_{\Phi\_RECT}$ into a digital value and compares the digital value to the active mode threshold voltage $V_{TH0}$. The ADC can also be a separate component exterior to the processor. In at least one embodiment, the controller 900 includes analog comparators to compare the value of input voltage $V_{\Phi\_RECT}$ to the active mode threshold $V_{TH0}$ and generate a comparison signal. In at least one embodiment, the comparison signal is used as a basis for determining whether controller 900 operates in PFC mode 1004 or active maintenance mode 1006. The processor 902 can be any type of processor including a digital signal processor. Memory 904 can be any type of memory including a read only memory or a read-write type memory.

In at least one embodiment, the active mode threshold voltage $V_{TH0}$ is set so that the active maintenance mode 1006 is not entered until the input voltage $V_{\Phi\_RECT}$ is close to a zero crossing and below a breakover voltage of the diac in dimmer 603. In at least one embodiment, the breakover voltage of the diac is 30V, and the active mode threshold voltage $V_{TH0}$ is set to 20V. Once the active threshold voltage $V_{TH0}$ is reached, controller 900 will operate switch 606 to generate an effective input resistance $R_{EFF}$ of switching power converter 802 to allow the triac 605 to properly operate. When the input voltage $V_{\Phi\_RECT}$ rises above the active threshold voltage $V_{TH0}$, in at least one embodiment, the dimming portion of input $V_{\Phi\_RECT}$ is over, i.e. dimmer 603 has ceased chopping the supply voltage $V_{IN}$, and the controller 900 operates to provide power factor correction for switching power converter 802. The particular execution frequency of triac compatibility algorithm 1000 is a matter of design choice and is preferably sufficient to allow triac compatibility algorithm 1000 to accurately respond to changes in the input voltage $V_{\Phi\_RECT}$ to allow triac 605 to function properly.

When controller 900 enters active maintenance mode 1006, controller 900 generates control signal $CS_1$ with a switch period tt of 0.5 msec (i.e. $f_{sw}$=2 kHz) and a pulse period of 14 μsec. In at least one embodiment, the period tt is dithered to the spread the spectrum of the control signal $CS_1$ and mitigate electromagnetic radiation at the switching frequency $f_{sw}$. After entering active maintenance mode 1006, triac compatibility algorithm 1000 continues to monitor the input voltage $V_{\Phi\_RECT}$ and compare the input voltage $V_{\Phi\_RECT}$ to active mode threshold voltage $V_{TH0}$.

Figure 11:
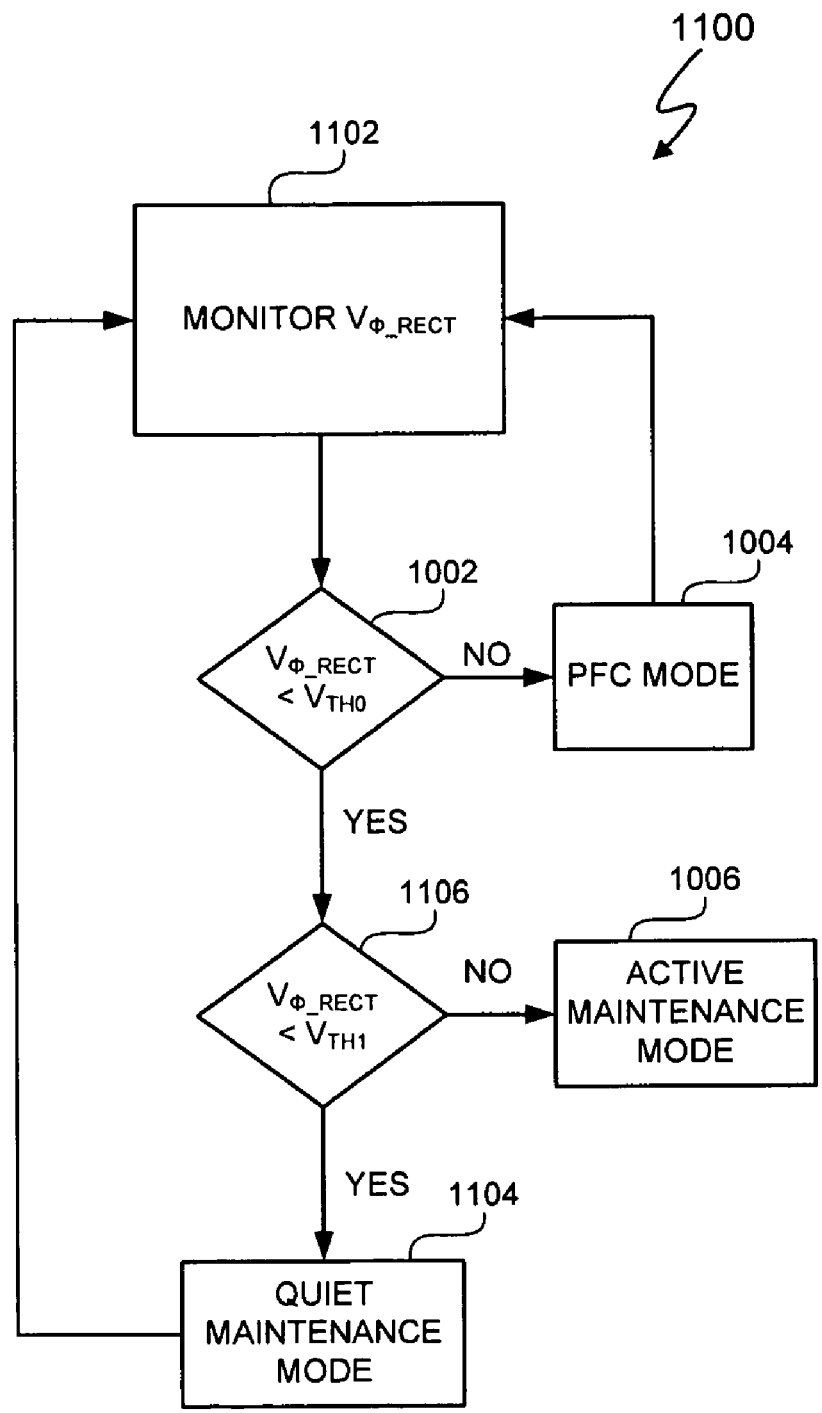
FIG. 11 depicts an exemplary triac compatibility algorithm having two maintenance modes.

FIG. 11 depicts a triac compatibility algorithm 1100, which, in at least one embodiment, is represented by code stored in memory 904 and executable by processor 902. Referring to FIGS. 8, 9, 10, and 11, in general, triac compatibility algorithm 1000 effectively removes charge from capacitor 115 and, thus, lowers the input voltage $V_{\Phi\_RECT}$ to allow sufficient current to flow into switching power converter 802 so that the triac of dimmer 603 operates properly during a dimming portion of the input voltage $V_{\Phi\_RECT}$. If the input voltage $V_{\Phi\_RECT}$ remains below a second threshold value $V_{TH1}$, triac compatibility algorithm 1100 causes controller 900 to enter quiet maintenance mode 1104 to increase the period tt of control signal $_{CS1}$ and, thus, further reduce the amount of switching of switch 606. Thus, by monitoring a comparison between input voltage $V_{\Phi\_RECT}$ and thresholds $V_{TH0}$ and a lower threshold $V_{TH1}$ and having active and quiet maintenance modes, controller 900 operates switching power converter more efficiently using triac compatibility algorithm 1100 relative to triac compatibility algorithm 1000. If the input voltage $V_{\Phi\_RECT}$ rises above the active threshold voltage $V_{TH0}$, in at least one embodiment, the dimming portion is over, i.e. dimmer 603 has ceased chopping the supply voltage $V_{IN}$, and the controller 900 operates to provide power factor correction for switching power converter 802.

Operation 1102 of triac compatibility algorithm 1100 monitors a comparison between input voltage $V_{\Phi\_RECT}$ and threshold voltages $V_{TH0}$ and $V_{TH1}$. Triac compatibility algorithm 1100 includes operations 1002 and 1004. If operation 1002 determines that input voltage $V_{\Phi\_RECT}$ is greater than active mode threshold voltage $V_{TH0}$, controller 900 enters PFC mode 1004. If operation 1002 determines that the input voltage $V_{\Phi\_RECT}$ is less than the active mode threshold voltage $V_{TH0}$, then operation 1106 determines whether the input voltage $V_{\Phi\_RECT}$ is less than the quiet mode threshold voltage $V_{TH1}$.

If operation 1106 determines that the input voltage $V_{\Phi\_RECT}$ is greater than or equal to the quiet threshold voltage $V_{TH1}$, triac compatibility algorithm 1100 causes controller 900 to enter active maintenance mode 1006. If the input voltage $V_{\Phi\_RECT}$ is less than the quiet threshold voltage $V_{TH1}$, triac compatibility algorithm 1100 causes controller 900 to enter the quiet maintenance mode 1104. The quiet maintenance mode 1104 further reduces switching of switch 606. In at least one embodiment, the quiet threshold voltage $V_{TH1}$ is 15V. When the input voltage $V_{\Phi\_RECT}$ decreases below the quiet threshold voltage $V_{TH1}$, in at least one embodiment, it is assumed that controller 900 does not need to pulse switch 606 to remove charge from capacitor 115. Thus, in the quiet maintenance mode 1104, controller 900 generates control signal $CS_1$ so that switch 606 does not conduct.

The particular execution frequency of triac compatibility algorithm 1100 is a matter of design choice and is preferably sufficient to allow triac compatibility algorithm 1100 to accurately respond to changes in the input voltage $V_{\Phi\_RECT}$ to allow triac 605 to function properly.

Accordingly, a controller controls a switching power converter to allow the switching power converter to allow a triac-based dimmer to dim a load, such as a lighting fixture having LEDs as light sources.

Although the present invention has been described in detail, it should be understood that various changes, substitutions and alterations can be made hereto without departing from the spirit and scope of the invention as defined by the appended claims.

What is claimed is:

1. A controller to control a switching power converter and provide compatibility between the switching power converter and a triac-based dimmer, wherein the switching power converter includes a switch to control voltage conversion of an input voltage to the switching power converter, the controller comprising:
one or more components to control the switch of the switching power converter to establish an input resistance of the switching power converter during a dimming portion of the input voltage when the input voltage is below a first threshold voltage and to cease operation of the switch when the input voltage is below a second threshold voltage, wherein the input resistance allows the triac-based dimmer to generate a phase modulated input voltage to the switching power converter having a substantially uninterrupted phase delay during each half-cycle of the input voltage during a dimming period.

2. The controller of claim 1 wherein the controller is further configured to provide power factor correction and voltage regulation after the dimming portion of the input voltage.

3. The controller of claim 1 wherein when the input voltage is below the first threshold voltage, the controller is configured to establish the input resistance of the switching power converter to allow the triac-based dimmer to phase modulate the input voltage with a substantially uninterrupted phase delay during each half-cycle of the input voltage during a dimming period.

4. The controller of claim 3 wherein the controller is further configured to provide power factor correction and voltage regulation unless the input voltage to the switching power converter is below the first threshold voltage.

5. The controller of claim 1 wherein the switching power converter include an inductor and the controller is configured to generate a pulse width modulated control signal to establish the input resistance using at least values of the inductor, a period of the control signal, and a pulse width of the control signal.

6. The controller of claim 5 wherein one or more values of the inductor, pulse width, and period are stored in a memory of the controller.

7. The controller of claim 5 wherein the controller is further configured to dither the period and the pulse width of the control signal.

8. The controller of claim 1 wherein the controller is further configured to provide power factor correction and voltage regulation unless the input voltage to the switching power converter is below the first threshold voltage, when the input voltage is below the first threshold voltage, the controller establishes the input resistance of the switching power converter to allow the triac-based dimmer to phase modulate the input voltage with a substantially uninterrupted phase delay during each half-cycle of the input voltage during a dimming period.

9. The controller of claim 1 wherein the dimming period is substantially uninterrupted when the triac of the triac-based dimmer introduces a single phase delay in the input voltage to the switching power converter during each half cycle of the input voltage during the dimming period.

10. The controller of claim 1 wherein the phase modulated input voltage to the switching power converter has a single phase delay during each half-cycle of the input voltage during the dimming period.

11. A method to control a switching power converter and provide compatibility between the switching power converter and a triac-based dimmer, wherein the switching power converter includes a switch to control voltage conversion of an input voltage to the switching power converter, the method comprising:
controlling the switch of the switching power converter to establish an input resistance of the switching power converter during a dimming portion of the input voltage when the input voltage is below a first threshold voltage, wherein the input resistance allows the triac-based dimmer to generate a phase modulated input voltage to the switching power converter having a substantially uninterrupted phase delay during each half-cycle of the input voltage during a dimming period and
controlling the switch to cease operation of the switch when the input voltage is below a second threshold voltage.

12. The method of claim 11 further comprising:
providing power factor correction and voltage regulation after the dimming portion of the input voltage.

13. The method of claim 11 further comprising:
establishing the input resistance of the switching power converter to allow the triac-based dimmer to phase modulate the input voltage with a substantially uninterrupted phase delay during each half-cycle of the input voltage during a dimming period when the input voltage is below the first threshold voltage.

14. The method of claim 13 further comprising:
providing power factor correction and voltage regulation unless the input voltage to the switching power converter is below the first threshold voltage.

15. The method of claim 11 wherein the switching power converter include an inductor, the method further comprising:
generating a pulse width modulated control signal to establish the input resistance using at least values of the inductor, a period of the control signal, and a pulse width of the control signal.

16. The method of claim 15 the method further comprising:
utilizing one or more values of the inductor, pulse width, and period stored in a memory of the controller to generate a pulse width modulated control signal.

17. The method of claim 15 the method further comprising:
dithering the period and the pulse width of the control signal.

18. The method of claim 11 further comprising:
providing power factor correction and voltage regulation unless the input voltage to the switching power converter is below a first threshold voltage;
establishing the input resistance of the switching power converter to allow the triac-based dimmer to phase modulate the input voltage with a substantially uninterrupted phase delay during each half-cycle of the input voltage during a dimming period when the input voltage is below the first threshold voltage.

19. The method of claim 11 wherein controlling the switch of the switching power converter further comprises controlling the switch of the switching power converter so that the dimming period is substantially uninterrupted when the triac of the triac-based dimmer introduces a single phase delay in the input voltage to the switching power converter during each half cycle of the input voltage during the dimming period.

20. The method of claim 11 wherein controlling the switch of the switching power converter further comprises controlling the switch of the switching power converter so that the phase modulated input voltage to the switching power converter has a single phase delay during each half-cycle of the input voltage during the dimming period.

21. An electronic system comprising:
a switching power converter to convert an input voltage to the switching power converter, wherein the switching power converter includes a switch to control voltage conversion of the input voltage to the switching power converter into the output voltage and the input voltage to the switching power converter is phase modulated during dimming periods by a triac-based dimmer; and
a controller, coupled to the switching power converter, to control the switch of the switching power converter to establish an input resistance of the switching power converter during a dimming portion of the input voltage when the input voltage is below a first threshold voltage and to cease operation of the switch when the input voltage is below a second threshold voltage, wherein the input resistance allows the triac-based dimmer to generate a phase modulated input voltage to the switching power converter having a substantially uninterrupted phase delay during each half-cycle of the input voltage during a dimming period.

22. The electronic system of claim 21 further comprising a load coupled to the switching power converter.

23. The electronic system of claim 22 wherein the load comprises at least one light emitting diode.

24. The electronic system of claim 21 further comprising the triac-based dimmer coupled to the switching power converter.

25. The electronic system of claim 21 wherein the phase modulated input voltage to the switching power converter has a single phase delay during each half-cycle of the input voltage during the dimming period.

* * * * *